(12) United States Patent
Yoshida

(10) Patent No.: US 7,984,120 B2
(45) Date of Patent: Jul. 19, 2011

(54) SELECTING SETTING OPTIONS METHOD, DEVICE AND COMPUTER PROGRAM PRODUCT

(75) Inventor: Yasunari Yoshida, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1186 days.

(21) Appl. No.: 11/188,728

(22) Filed: Jul. 26, 2005

(65) Prior Publication Data

US 2006/0026600 A1 Feb. 2, 2006

(30) Foreign Application Priority Data

Jul. 27, 2004 (JP) ................. 2004-219049

(51) Int. Cl.
G06F 15/177 (2006.01)
(52) U.S. Cl. ...................................... 709/220
(58) Field of Classification Search .......... 709/221–222; 358/1.13–1.15
See application file for complete search history.

(56) References Cited

U.S. PATENT DOCUMENTS

| 6,480,304 | B1* | 11/2002 | Os et al. ........................ 358/474 |
| 6,647,434 | B1* | 11/2003 | Kamepalli ...................... 710/14 |
| 6,822,754 | B1* | 11/2004 | Shiohara ...................... 358/1.15 |
| 7,002,702 | B1* | 2/2006 | Machida ...................... 358/1.15 |
| 7,102,783 | B2* | 9/2006 | Morooka et al. ............. 358/1.15 |
| 7,190,467 | B2* | 3/2007 | Simpson et al. ............... 358/1.1 |
| 7,346,673 | B1 | 3/2008 | Oda |
| 7,450,256 | B2* | 11/2008 | Simpson et al. ............. 358/1.15 |
| 7,557,950 | B2* | 7/2009 | Hatta et al. .................... 358/1.9 |
| 7,765,501 | B2* | 7/2010 | Torone et al. ................. 709/220 |
| 2001/0043357 | A1* | 11/2001 | Owa et al. .................... 358/1.15 |
| 2004/0101336 | A1* | 5/2004 | Azami ............................ 400/61 |
| 2004/0136023 | A1* | 7/2004 | Sato ............................. 358/1.13 |
| 2005/0018242 | A1* | 1/2005 | Azami ......................... 358/1.15 |

FOREIGN PATENT DOCUMENTS

| JP | 8-107470 | A | 4/1996 |
| JP | 10-254656 | A | 9/1998 |
| JP | 11-203077 | A | 7/1999 |
| JP | 2000-227847 | A | 8/2000 |
| JP | 2001-075755 | A | 3/2001 |
| JP | 2001-350681 | A | 12/2001 |
| JP | 2002-182885 | A | 6/2002 |
| JP | 2002-199147 | A | 7/2002 |
| JP | 2003-099228 | | 4/2003 |
| JP | 2003-099228 | A | 4/2003 |

OTHER PUBLICATIONS

Notification of Reasons of Rejection mailed Jun. 23, 2009 in Japanese Application No. 2004-219049 and English translation thereof.

* cited by examiner

*Primary Examiner* — Kevin Bates
*Assistant Examiner* — Minh-Chau Nguyen
(74) *Attorney, Agent, or Firm* — Banner & Witcoff, Ltd.

(57) ABSTRACT

A method of setting up an operating state for a plurality of predetermined devices is provided. The method is carried out on a terminal device to which the predetermined devices are connected. The method includes the steps of collecting, for a setting item relating to a function of each of the predetermined devices, setting options which the predetermined devices support, displaying the setting options collected for the setting item, allowing the user to select one of the setting options for the setting item, and identifying at least one device supporting the selected one of the setting options from among the predetermined devices.

27 Claims, 20 Drawing Sheets

| | PRINTER NAME | TRAY | MEDIA TYPE | PAPER SIZE | COLOR | PRINTING QUALITY |
|---|---|---|---|---|---|---|
| MULTIFUNCTION DEVICE 11 | Printer #1 | TRAY1 TRAY2 | PLAIN THICK THICKER TRANSPARENCIES POST CARD | A4 LETTER LEGAL EXECUTIVE B5(JIS) A5 POSTCARD | GRAY SCALE | FINE/ NORMAL/ FAST |
| MULTIFUNCTION DEVICE 12 | Printer #2 | TRAY1 TRAY2 | PLAIN THICK THICKER TRANSPARENCIES POST CARD | A4 LETTER LEGAL EXECUTIVE B5(JIS) A5 POSTCARD | GRAY SCALE | FINE/ NORMAL/ FAST |
| MULTIFUNCTION DEVICE 13 | Printer #3 | TRAY1 | PLAIN INKJET GLOSSY TRANSPARENCIES | A4 LETTER LEGAL EXECUTIVE B5(JIS) A5 POSTCARD | COLOR/ GRAY SCALE | PHOTO/FINE/ NORMAL/ FAST |
| MULTIFUNCTION DEVICE 14 | Printer #4 | TRAY1 | PLAIN INKJET GLOSSY TRANSPARENCIES | A4 LETTER LEGAL EXECUTIVE B5(JIS) A5 POSTCARD | COLOR/ GRAY SCALE | PHOTO/FINE/ NORMAL/ FAST |
| MULTIFUNCTION DEVICE 15 | Printer #5 | TRAY1 | PLAIN INKJET GLOSSY TRANSPARENCIES | A4 LETTER LEGAL EXECUTIVE B5(JIS) A5 A6 POSTCARD INDEX CARD PHOTO L PHOTO 2L POSTCARD(DOUBLE) | COLOR/ GRAY SCALE | PHOTO (HIGHQUALITY) /PHOTO/FINE/ NORMAL/ FAST |

FIG. 2

|  | TRAY | MEDIA TYPE | PAPER SIZE |
|---|---|---|---|
| MULTIFUNCTION DEVICE 11 | TRAY1<br>TRAY2 | PLAIN<br>PLAIN | A4<br>LETTER |
| MULTIFUNCTION DEVICE 12 | TRAY1<br>TRAY2 | PLAIN<br>THICK | A4<br>LETTER |
| MULTIFUNCTION DEVICE 13 | TRAY1 | PLAIN | A4 |
| MULTIFUNCTION DEVICE 14 | TRAY1 | INKJET | A4 |
| MULTIFUNCTION DEVICE 15 | TRAY1 | GLOSSY | L SIZE |

FIG. 3

| | SCANNER NAME | RESOLUTION | NUMBER OF COLORS | TYPE OF FEEDING |
|---|---|---|---|---|
| MULTIFUNCTION DEVICE 11 | SCANNER #1 | 100 × 100 dpi<br>150 × 150 dpi<br>200 × 200 dpi<br>300 × 300 dpi<br>400 × 400 dpi<br>600 × 600 dpi<br>1200 × 1200 dpi<br>2400 × 2400 dpi | MONOCHROME GRAY | DOCUMENT FEEDER |
| MULTIFUNCTION DEVICE 12 | SCANNER #2 | 100 × 100 dpi<br>150 × 150 dpi<br>200 × 200 dpi<br>300 × 300 dpi<br>400 × 400 dpi<br>600 × 600 dpi<br>1200 × 1200 dpi<br>2400 × 2400 dpi<br>4800 × 4800 dpi<br>9600 × 9600 dpi | MONOCHROME/ GRAY/ 256 COLORS/ 24BIT COLOR | DOCUMENT FEEDER/ FLATBED |
| MULTIFUNCTION DEVICE 13 | SCANNER #3 | 100 × 100 dpi<br>150 × 150 dpi<br>200 × 200 dpi<br>300 × 300 dpi<br>400 × 400 dpi<br>600 × 600 dpi<br>1200 × 1200 dpi<br>2400 × 2400 dpi | MONOCHROME/ GRAY/ 256 COLORS/ 24BIT COLOR | DOCUMENT FEEDER |
| MULTIFUNCTION DEVICE 14 | SCANNER #4 | 100 × 100 dpi<br>150 × 150 dpi<br>200 × 200 dpi<br>300 × 300 dpi<br>400 × 400 dpi<br>600 × 600 dpi<br>1200 × 1200 dpi<br>2400 × 2400 dpi<br>4800 × 4800 dpi<br>9600 × 9600 dpi | MONOCHROME/ GRAY/ 256 COLORS/ 24BIT COLOR | FLATBED |
| MULTIFUNCTION DEVICE 15 | SCANNER #5 | 100 × 100 dpi<br>150 × 150 dpi<br>200 × 200 dpi<br>300 × 300 dpi<br>400 × 400 dpi<br>600 × 600 dpi<br>1200 × 1200 dpi<br>2400 × 2400 dpi<br>4800 × 4800 dpi<br>9600 × 9600 dpi | MONOCHROME/ GRAY/ 256 COLORS/ 24BIT COLOR | DOCUMENT FEEDER/ FLATBED |

FIG. 4

| PRINTER NAME | MEDIA TYPE | SHEET SIZE | COLOR | PRINTING QUALITY |
|---|---|---|---|---|
| INTEGRATED PRINTER | PLAIN<br>THICK<br>THICKER<br>TRANSPARENCIES<br>POST CARD<br>INKJET<br>GLOSSY | A4<br>LETTER<br>LEGAL<br>EXECUTIVE<br>B5(JIS)<br>A5<br>A6<br>POSTCARD<br>INDEX CARD<br>PHOTO L<br>PHOTO 2L<br>POST – CARD( DOUBLE) | COLOR/<br>GRAY SCALE | PHOTO (HIGHQUALITY)<br>/PHOTO/FINE/<br>NORMAL/<br>FAST |

FIG. 6

| SCANNER NAME | RESOLUTION | NUMBER OF COLORS | TYPE OF FEEDING |
|---|---|---|---|
| INTEGRATED SCANNER | 100 × 100 dpi<br>150 × 150 dpi<br>200 × 200 dpi<br>300 × 300 dpi<br>400 × 400 dpi<br>600 × 600 dpi<br>1200 × 1200 dpi<br>2400 × 2400 dpi<br>4800 × 4800 dpi<br>9600 × 9600 dpi | MONOCHROME/<br>GRAY/<br>256 COLORS/<br>24BIT COLORS | DOCUMENT FEEDER/<br>FLATBED |

FIG.13

| NAME OF RECOMMENDABLE SETTING | TRAY | MEDIA TYPE | PAPER SIZE | COLOR | PRINTING QUALITY | OTHER SETTINGS |
|---|---|---|---|---|---|---|
| plain_A4 | TRAY 1 | PLAIN | A4 | GRAY SCALE | NORMAL | |
| plain_A4_2in 1 | TRAY 1 | PLAIN | A4 | GRAY SCALE | NORMAL | 2in 1 |
| plain_A4_fast | TRAY 1 | PLAIN | A4 | GRAY SCALE | FAST | |
| plain_A4_color | TRAY 1 | PLAIN | A4 | COLOR | NORMAL | |
| plain_A4_color_2in 1 | TRAY 1 | PLAIN | A4 | COLOR | NORMAL | 2in 1 |
| plain_latter | TRAY 2 | PLAIN | LETTER | GRAY SCALE | NORMAL | |
| postcard_color | TRAY 1 | POSTCARD | POSTCARD | COLOR | NORMAL | |
| inkjet_A4 | TRAY 1 | GLOSSY | A4 | COLOR | PHOTO | |
| glossy_photo L_color | TRAY 1 | GLOSSY | PHOTO L | COLOR | PHOTO | |
| glossy_photo L | TRAY 1 | GLOSSY | PHOTO L | COLOR | PHOTO | |
| glossy_photo L_frameless | TRAY 1 | GLOSSY | PHOTO L | COLOR | PHOTO | FRAMELESS |

FIG.18

MFC-0001 Printer

| NAME OF RECOMMENDABLE SETTING | TRAY | MEDIA TYPE | PAPER SIZE | COLOR | PRINTING QUALITY | OTHER SETTINGS |
|---|---|---|---|---|---|---|
| plain_A4 | TRAY 1 | PLAIN | A4 | GRAY SCALE | NORMAL | |
| plain_latter | TRAY 2 | PLAIN | LETTER | GRAY SCALE | NORMAL | |
| plain_A4_2in 1 | TRAY 1 | PLAIN | A4 | GRAY SCALE | NORMAL | 2in 1 |

MFC-0002 Printer

| NAME OF RECOMMENDABLE SETTING | TRAY | MEDIA TYPE | PAPER SIZE | COLOR | PRINTING QUALITY | OTHER SETTINGS |
|---|---|---|---|---|---|---|
| plain_A4 | TRAY 1 | PLAIN | A4 | GRAY SCALE | NORMAL | |
| plain_latter | TRAY 2 | PLAIN | LETTER | GRAY SCALE | NORMAL | |
| plain_A4_fast | TRAY 1 | PLAIN | A4 | GRAY SCALE | FAST | |

MFC-0003 Printer

| NAME OF RECOMMENDABLE SETTING | TRAY | MEDIA TYPE | PAPER SIZE | COLOR | PRINTING QUALITY | OTHER SETTINGS |
|---|---|---|---|---|---|---|
| plain_A4_color | TRAY 1 | PLAIN | A4 | COLOR | NORMAL | |
| glossy_photo L_color | TRAY 1 | GLOSSY | PHOTO L | COLOR | PHOTO | |
| plain_A4_color_2in 1 | TRAY 1 | PLAIN | A4 | COLOR | NORMAL | 2in 1 |
| postcard_color | TRAY 1 | POSTCARD | POSTCARD | COLOR | NORMAL | |

MFC-0004 Printer

| NAME OF RECOMMENDABLE SETTING | TRAY | MEDIA TYPE | PAPER SIZE | COLOR | PRINTING QUALITY | OTHER SETTINGS |
|---|---|---|---|---|---|---|
| plain_A4_color | TRAY 1 | PLAIN | A4 | COLOR | NORMAL | |
| inkjet_A4 | TRAY 1 | GLOSSY | A4 | COLOR | PHOTO | |
| plain_A4_color_2in 1 | TRAY 1 | PLAIN | A4 | COLOR | NORMAL | 2in 1 |

MFC-0005 Printer

| NAME OF RECOMMENDABLE SETTING | TRAY | MEDIA TYPE | PAPER SIZE | COLOR | PRINTING QUALITY | OTHER SETTINGS |
|---|---|---|---|---|---|---|
| plain_A4_color | TRAY 1 | PLAIN | A4 | COLOR | NORMAL | |
| glossy_photo L | TRAY 1 | GLOSSY | PHOTO L | COLOR | PHOTO | |
| plain_A4_color_2in 1 | TRAY 1 | PLAIN | A4 | COLOR | NORMAL | 2in 1 |
| glossy_photo L_frameless | TRAY 1 | GLOSSY | PHOTO L | COLOR | PHOTO | FRAMELESS |

FIG.19

SELECTING SETTING OPTIONS METHOD, DEVICE AND COMPUTER PROGRAM PRODUCT

INCORPORATION BY REFERENCE

This application claims priority under 35 U.S.C. §119 from Japanese Patent Application No. 2004-219049, filed on Jul. 27, 2004, the entire subject matter of the application being incorporated herein by reference.

BACKGROUND

1. Technical Field

The following description relates to setup operation to be performed on a computer to set up an operating state in a situation in which devices are connected to the computer.

2. Related Art

Recently, use of a network system in which devices are connected to a computer through a network cable, or use of a computer system in which a device having a first function and another device having a second function (different from the first function) are directly connected to a computer is increasing. In such a system, a user is able to use one of the devices, for example, by selecting one of the devices through a window in which all of the devices are listed.

Considering a situation in which five devices are connected to a user's computer, the user needs to select one of the five devices and to set up an operating state through use of a user interface (i.e., a setup window) of a device driver corresponding to a selected device. It should be noted that at a stage of selecting one of the five devices, the user may not know which of the five devices can support an operation state required by the user.

For this reason, there is a possibility that the user selects an inappropriate device which does not support the operating state required by the user. If the user notices that he selected the inappropriate device after the completion of setting up of the operating state on the user interface of the device driver, the operating state set up by the user comes to nothing. That is, the user needs to redo selection of a device and setup of a device driver until an appropriate device is selected.

Japanese Patent Provisional Publication No. 2003-99228 discloses a system in which information relating to printers provided in the system is stored in a server. In this system, the server receives a print job from a client computer and analyzes a printing state contained in the print job so that the print job is assigned to an appropriate one of the printers. In the publication No. 2003-99228, it is described that the user is not required to select one of the printers to be assigned the print job.

However, the publication does not teach how the user knows operating states which the devices in the system support and how the user designates a desirable operating state on the client computer.

It is understood that the above mentioned drawbacks of the conventional system applies to a system in which image reading devices (e.g., scanners) are provided.

SUMMARY

A method, device and computer program product for allowing a user to easily designate an operating state which at least one of predetermined devices connected to the user's device supports are provided.

BRIEF DESCRIPTION OF THE ACCOMPANYING DRAWINGS

FIG. 1 schematically shows a configuration of a network system in which a personal computer and five multifunction devices are included;

FIG. 2 is a list of items of information regarding all of printing functions;

FIG. 3 shows the media type, and the paper size actually placed in trays of the multifunction devices;

FIG. 4 is a list of items of information regarding all of image scanning functions;

FIG. 6 shows available setting values supported by the integrated printer driver;

FIG. 13 shows available setting values supported by the integrated scanner driver;

FIG. 18 shows examples of the recommendable settings which printers shown in the virtual printer setting screen of FIG. 17 support;

FIG. 19 shows tables of recommendable settings respectively supported by the printers shown in FIG. 17.

DETAILED DESCRIPTION

General Overview

Figure 1:
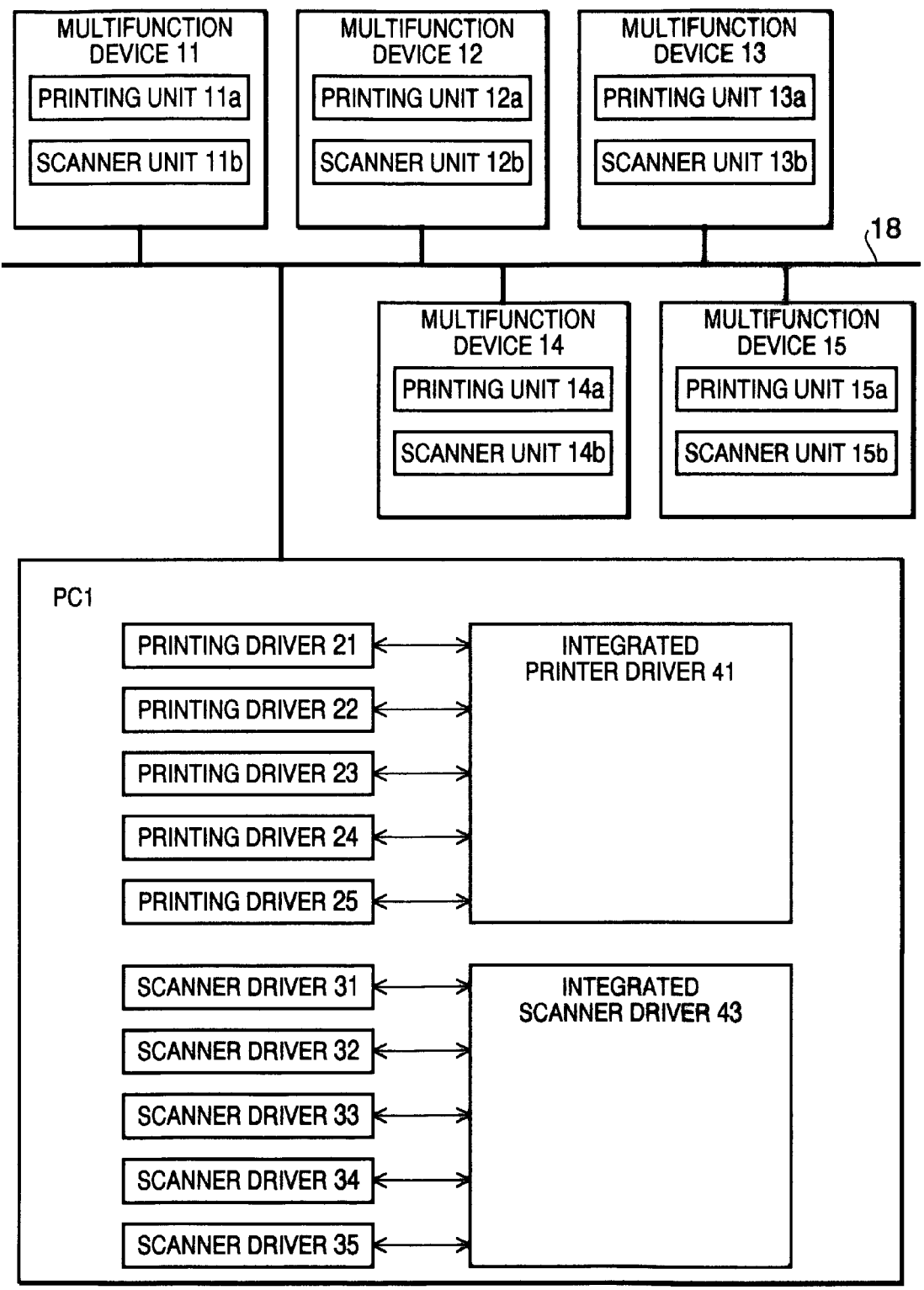

A method of setting up an operating state for predetermined devices is provided. The method is carried out on a terminal device to which the predetermined devices are connected. The method includes the steps of collecting, for a setting item relating to a function of each of the predetermined devices, setting options which the predetermined devices support, displaying the setting options collected for the setting item, allowing a user to select one of the setting options for the setting item, and identifying at least one device supporting the selected one of the setting options from the predetermined devices.

With this configuration, the setting options are displayed on the terminal device so that the user can check the setting options. Therefore, the user can select one of the setting values viewing all of the setting options. It becomes possible to avoid occurrence of a problem that the user undesirably repeats selection of one of the predetermined devices until the user finds an appropriate one of the predetermined devices supporting a desirable setting option (i.e., a desirable operating state).

Optionally, the displaying step may be executed such that fields respectively corresponding to setting items are displayed on a setting screen and the setting options are displayed on each of the fields simultaneously.

With this configuration, the user can select one of the setting options through the setting screen.

Still optionally, the predetermined devices may respectively include image forming devices.

In an example, the at least one setting item may include at least one of a media type, a paper size, color and printing quality.

Still optionally, the predetermined devices may respectively include image reading devices.

In an example, the at least one setting item may include at least one of resolution, a number of colors, and a type of feeding.

Still optionally, the method may include the step of displaying the at least one device identified by the identifying step in a first displaying state.

Since the identified device is displayed in a first displaying state, the use securely recognizes the identified device.

In an example, the first displaying state may be a highlighted state.

Still optionally, the method may include the step of displaying remaining ones of the predetermined devices not identified in the identifying step in a second displaying state different from the first displaying state.

Since the remaining devices not identified in the identifying step are displayed in a second displaying state, the user securely recognizes the remaining devices.

In an example, the second displaying state may be a state in which each of the remaining devices is identified with an attention mark.

Still optionally, the setting options may be collected for setting items in the collecting step.

Still optionally, the method include the steps of judging whether each of the setting options of one of the setting items is selectable based on selected options regarding the other of the setting items, displaying setting options judged to be selectable by the judging step in a first displaying state, and displaying setting options judged to be not selectable by the judging step in a second displaying state different from the first displaying state.

Since the selectable options are displayed in the first displaying state and the setting options not selectable are displayed in the second displaying state, the user can securely select the selectable setting options.

Still optionally, the judging step may be conducted further based on states of the predetermined devices.

In an example, the second displaying state may be a state in which each of the setting options judged to be not selectable is identified with an attention mark.

With this configuration, the difference between the first displaying state and the second displaying state becomes more distinguishable.

Still optionally, the method may include the steps of displaying combinations of setting options, each of the combinations including setting options respectively corresponding to setting items, allowing the user to select a combination of setting options from among the combinations, and identifying at least one device supporting the plurality of setting options of the selected combination from the predetermined devices.

With this configuration, by selecting one of the combinations of setting options, setting options for all of the setting items can be selected at a time.

Optionally, the method may include the step of collecting the combinations of setting options from the predetermined devices.

A terminal device for setting up an operating state for predetermined devices connected to the terminal device is provided. The terminal device is provided with a collecting system that collects, for at least one setting item relating to a function of each of the predetermined devices, setting options which the predetermined devices support, a displaying system that displays the setting options collected for the at least one setting item by the collecting system, a selecting system that allows the user to select one of the setting options for the at least one setting item, and an identifying system that identifies at least one device supporting the selected one of the setting options from among the predetermined devices.

With this configuration, the setting options are displayed on the terminal device so that the user can check all of the setting options. Therefore, the user can select one of the setting values viewing all of the setting options. It becomes possible to avoid occurrence of a problem that the user undesirably repeats selection of one of the predetermined devices until the user finds an appropriate one of the predetermined devices supporting a desirable setting option (i.e., a desirable operating state).

Optionally, the predetermined devices may respectively include image forming devices.

Still optionally, the predetermined devices may respectively include image reading devices.

A method of setting up an operating state for predetermined devices is provided. The method is carried out on a terminal device to which the predetermined devices are connected. The method includes the steps of collecting, for at least one setting item relating to a function of each of the predetermined devices, setting options which the predetermined devices support, displaying the setting options collected for the at least one setting item, allowing the user to select one of the setting options for the at least one setting item, and notifying the user of at least one device of the predetermined devices supporting the selected one of the setting options.

With this configuration, the setting options are displayed on the terminal device so that the user can check all of the setting options. Therefore, the user can select one of the setting values viewing all of the setting options. Further, the user is notified of at least one device supporting the selected one of the setting options. Therefore, it becomes possible to avoid occurrence of a problem that the user undesirably repeats selection of one of the predetermined devices until the user finds an appropriate one of the predetermined devices supporting a desirable setting option (i.e., a desirable operating state).

The device and method can be realized when appropriate programs are provided and executed by a computer. Such programs may be stored on a recording medium such as a flexible disk, CD-ROM, memory cards and the like and distributed. Alternatively or optionally, such programs can be distributed through networks such as the Internet.

A computer program product for use on a computer is provided. The computer program product comprising computer readable instructions that cause the computer to carry out a method of setting up a predetermined device. The method includes the step of a setting screen displaying step of displaying a setting screen configured such that a plurality of selection fields respectively corresponding to a plurality of setting items regarding each of a plurality of predetermined devices are included in the setting screen, and a user is allowed to select a setting value from among a plurality of options in each of the plurality of fields.

With this configuration, the setting options are displayed on the computer so that the user can check the setting options. Therefore, the user can select one of the setting values viewing the setting options. It becomes possible to avoid occurrence of a problem that the user undesirably repeats selection of one of the predetermined devices until the user finds an appropriate one of the predetermined devices supporting a desirable setting option.

In an example, the plurality of predetermined devices may include a plurality of image forming devices.

In another example, the plurality of predetermined devices may include a plurality of image reading devices.

A device for setting up a predetermined device is provided. The device includes a setting screen displaying means for displaying a setting screen configured such that a plurality of selection fields respectively corresponding to a plurality of setting items regarding each of a plurality of predetermined devices are included in the setting screen, and a user is allowed to select a setting value from among a plurality of options in each of the plurality of fields.

With this configuration, the setting options are displayed on the device so that the user can check the setting options. Therefore, the user can select one of the setting values viewing the setting options. It becomes possible to avoid occurrence of a problem that the user undesirably repeats selection of one of the predetermined devices until the user finds an appropriate one of the predetermined devices supporting a desirable setting option.

In an example, the plurality of predetermined devices may include a plurality of image forming devices.

In another example, the plurality of predetermined devices may include a plurality of image reading devices.

A method of setting up an operating state for a plurality of predetermined devices is provided. The method is carried out on a terminal device to which the plurality of predetermined devices are connected. The method includes the steps of collecting, for a setting item relating to a function of each of the plurality of predetermined devices, setting options which the plurality of predetermined devices support, allowing a user to select a device from among the plurality of predetermined devices, and displaying the setting options which the device selected by the user supports so that the user can check the setting options.

With this configuration, by simply selecting a device form among the plurality of predetermined devices, the user can know setting options that the selected device supports.

A method of setting up an operating state for a plurality of predetermined devices is provided. The method is carried out on a terminal device to which the plurality of predetermined devices are connected. The method includes the steps of displaying a plurality of combinations of setting options, each of the combinations including a plurality of setting options respectively corresponding to a plurality of setting items, allowing the user to select a combination of setting options from among the plurality of combinations, and identifying at least one device supporting the plurality of setting options of the selected combination from the plurality of predetermined devices.

Optionally, the method may include the step of collecting the plurality of combinations of setting options from the plurality of predetermined devices.

Illustrative Embodiments

Hereafter, an illustrative embodiment will be described with reference to the accompanying drawings.

FIG. 1 schematically shows a configuration of a network system in which a PC (personal computer) 1 and five multifunction devices 11 to 15 are included. These devices are connected to one another via a LAN (local area network) 18.

The PC 1 has a typical configuration as a personal computer. That is, the PC 1 includes a CPU, a ROM, a RAM, an inputting unit (e.g., a keyboard and a pointing device), a display unit, and an auxiliary storage unit (e.g., a hard disk drive). An OS (operating system) such as Windows®, Linux®, or MacOS® is implemented on the PC 1. On the PC 1, basic functions (e.g., an I/O function for the hard disk drive) to be utilized by application programs are provided by the OS. In the following explanation, it is assumed that Windows® is implemented on the PC 1.

Each of the multifunction devices 11 to 15 includes a printing unit (11*a* to 15*a*) and a scanner unit (11*b* to 15*b*) and a communication unit (not shown). By this configuration, each multifunction device provides a printing function, an image scanning function, a copying function, and a facsimile function. In the network system shown in FIG. 1, each functional unit implemented in each multifunction device can be regarded as one distinct device.

As shown in FIG. 1, printer drivers 21 to 25 respectively corresponding to the multifunction devices 11 to 15 are installed on the PC 1. A printing operation and a print related function to be provided by each multifunction device (11 to 15) are performed under control of each printer driver (21 to 25). Further, a plurality of scanner drivers 31 to 35 respectively corresponding to the multifunction devices 11 to 15 are installed on the PC 1. A reading operation and an image scanner related function to be provided by each multifunction device are performed under control of each scanner driver.

Further, the PC 1 includes an integrated printer driver 41 and an integrated scanner driver 43. As described in detail later, the integrated printer driver 41 is configured as a virtual printer driver which is capable of controlling all of the printing units 11*a*, 12*a*, 13*a*, 14*a* and 15*a* of the multifunction devices 11 to 15. In actuality, the integrated printer driver 41 is a software component which provides a user interface enabling a user to select setting options that at least one of the printer drivers 21 to 25 supports.

More specifically, the integrated printer driver 41 has a function of collecting pieces of information from the printer drivers 21 to 25, respectively, and displaying the pieces of information simultaneously on the display unit of the PC 1. Further, the integrated printer driver 41 has a function of selecting one of the printer drivers 21 to 25 using the collected pieces of information and information inputted by the user. The information inputted by the user is sent to the selected printer driver. By these functions, for the user, the integrated printer driver 41 appears to be a driver program having all of the functions that the printer drivers 21 to 25 have.

As described in detail later, the integrated scanner driver 43 is configured as a virtual scanner driver which is capable of controlling all of the scanner units 11*b*, 12*b*, 13*b*, 14*b* and 15*b* of the multifunction devices 11 to 15. In actuality, the integrated scanner driver 43 is a software component which provides a user interface enabling a user to select setting options to control the scanner drivers 31 to 35 despite the fact that the integrated scanner driver 43 does not have the function of directly controlling the image scanning functions of all of the scanner units 11*b* to 15*b*.

More specifically, the integrated scanner driver 43 has a function of collecting pieces of information from the scanner drivers 31 to 35, respectively, and displaying the pieces of information simultaneously on the display unit of the PC 1. Further, the integrated scanner driver 43 has a function of selecting one of the scanner drivers 31 to 35 based on the obtained pieces of information and information (setting options) designated by the user. The information designated by the user is sent to the selected scanner driver. By these functions, for the user, the integrated scanner driver 43 appears to be a driver program having all of the functions that the scanner drivers 31 to 35 have despite the fact that the integrated scanner driver 43 does not have the function of directly controlling the image scanning functions of all of the scanner units 11b to 15b.

FIG. 2 is a list of items of information regarding all of the printing functions that the multifunction devices 11 to 15 have. In FIG. 2, a printer name represents a device name assigned to each multifunction device in the PC 1. As shown in FIG. 2, the information regarding the printing function includes the number of trays, an available media type (sheet type), an available paper size, color (color/gray scale), and printing quality. Each of the number of trays, the available media type, the available paper size, color (color/gray scale), and printing quality varies among the multifunction devices 11 to 15.

The printer drivers 21 to 25 can know the information of the media type and paper size currently assigned to the multifunction devices 11 to 15 and the color and printing quality being designated by the user by obtaining such information from the multifunction devices 11 to 15 or receiving user inputs to the printer drivers 21 to 25. After such information is obtained, each of the printer drivers 21 to 25 is able to perform a printing operation according to the obtained information, so that an optimum printing operation can be performed by using the obtained information.

In this illustrative embodiment, it is assumed that the sheets as shown in a table illustrated in FIG. 3 are set in the sheet trays of the multifunction devices 11 to 15.

FIG. 4 is a list of items of information regarding all of the scanning functions that the multifunction devices 11 to 15 have. In FIG. 4, a scanner name represents a device name assigned to each multifunction device in the PC 1. As shown in FIG. 4, the information regarding the scanning function includes the resolution, color, and the type of feeding. Each of the resolution, the number of colors, and the type of feeding varies among the multifunction devices 11 to 15.

The scanner drivers 31 to 35 can know the information of the resolution, the number of colors and the type of feeding currently assigned to the multifunction devices 11 to 15 by obtaining such information from the multifunction devices 11 to 15 or receiving user inputs to the scanner drivers 31 to 35. After such information is obtained, each of the scanner drivers 31 to 35 is able to perform a scanning operation according to the obtained information, so that an optimum scanning operation can be performed by using the obtained information.

Next, a process for registering the printer drivers 21 to 25 in the integrated printer driver 41 will be explained with reference to FIG. 5. The printer driver registering process is executed by the PC 1. The printer driver registering process may be initiated at anytime. However, it is preferable that the printer driver registering process is initiated at a time at which each printer driver is installed in the PC 1 if the network system is designed such that the registration of all of the printer drivers 21 to 25 is essential. Alternatively, the user may initiate the printer driver registering process at any desired time if the network system is designed such that the registration of all of the printer drivers 21 to 25 is not essential, or the printer driver registering process may be initiated when the initiation of one of (or all of) the multifunction devices 11 to 15 is detected.

Figure 5:
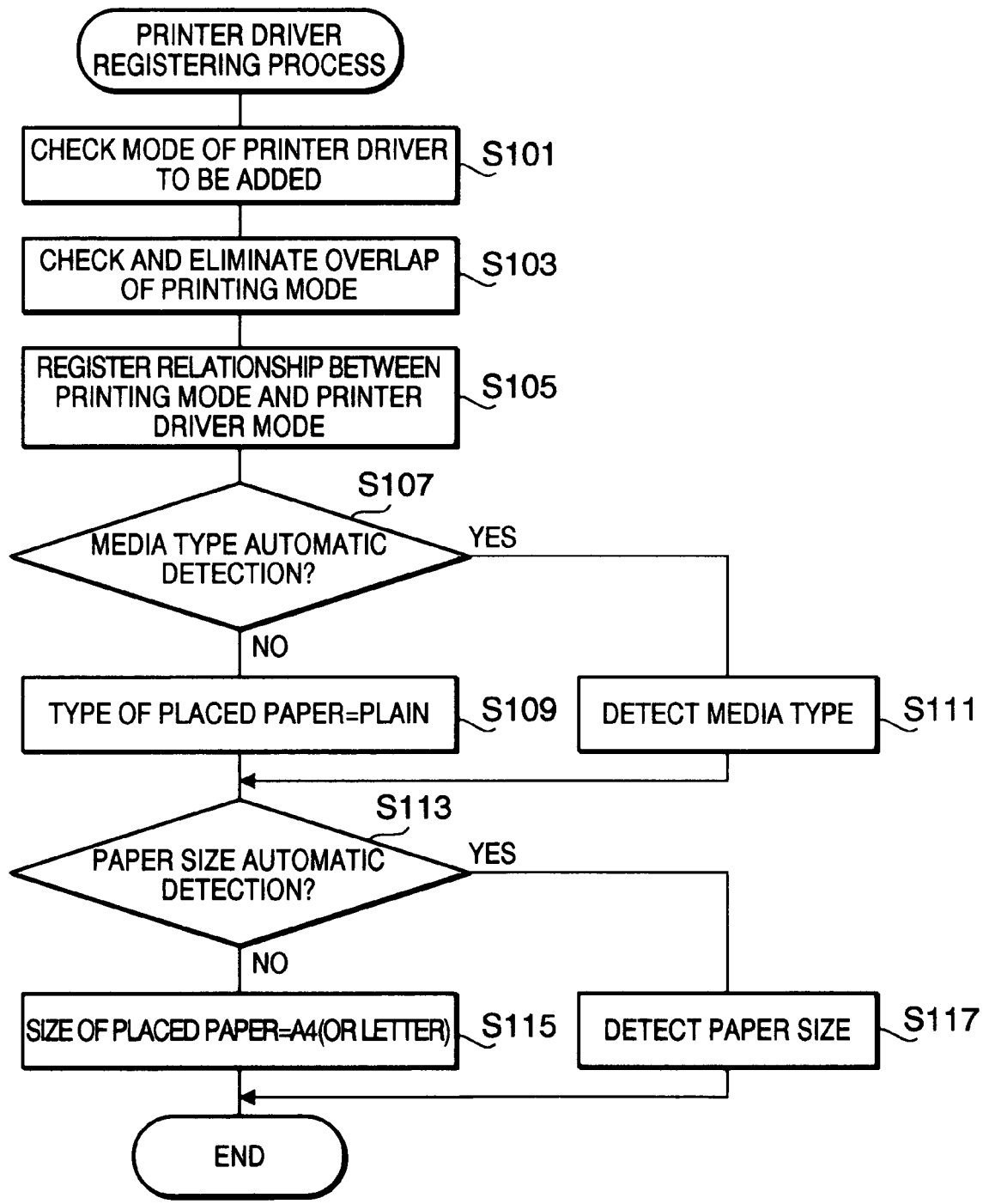
FIG. 5 is a flowchart illustrating a printer driver registering process for registering printer drivers in an integrated printer driver.

As shown in FIG. 5, first, the PC 1 checks printing modes (i.e., setting values) of a printer driver (i.e., a targeted printer driver) to be added to the integrated printer driver 41 (step S101). Specifically, in step S101, available setting values for each setting item (e.g., the media type, the paper size, the color or the printing quality) of the targeted printer driver are obtained (listed). For example, with regard to the media type, more than five setting values including "plain paper", "thick paper", "thicker paper", "Transparencies" and "post card" may be listed (see FIG. 2). Such a checking process for the printing modes can be performed for all of the other setting items (i.e., for the paper size, the color, and the printing quality).

Next, the PC 1 checks whether overlap between the printing modes exists or not, and eliminates overlaps of the printing modes (S103). Specifically, in step S103, if a setting value obtained in step S101 and a setting value which has been obtained (listed) in step S101 in the previously executed printer driver registering process are equal to each other, one of the same setting values is deleted. For example, if the available setting values for the media type obtained in step S101 in the past printer driver registering process executed for the multifunction device 11 are "plain paper", "thick paper", "thicker paper", "Transparencies", and "postcard" and if available setting values for the media type obtained in step S101 in the subsequent printer driver registering process executed for the multifunction device 13 are "plain paper", "inkjet sheet", "glossy paper", and "Transparencies", one of the same setting values of "plain paper" is redundant and also one of the same setting values of "Transparencies" is redundant. Therefore, in this case one of the two setting values of "plain paper" is deleted and one of the two setting values of "Transparencies" is also deleted. Such a process is also performed for all of the remaining setting items (e.g., "the paper size", "the color" and "imaging quality").

Next, in step S105, the PC 1 registers the relationship between the setting values collected and consolidated in step S103 and setting values which each printer driver supports. For example, if "plain paper", "thick paper", "thicker paper", "Transparencies", "postcard", "inkjet sheet", and "glossy paper" are listed in step S103 as available setting values for the media type, four setting values of "plain paper", "Transparencies", "inkjet sheet", and "glossy paper" are defined as available media types of the multifunction device 13, and "thick paper", "thicker paper" and "postcard" are defined as unavailable media types of the multifunction device 13. Such a registering operation is performed for each of the remaining setting items (e.g., the paper size, the color, and the printing quality.

Next, the PC 1 checks whether the targeted printer driver supports an automatic media type detection function for automatically detecting the type of placed paper (S107). If the targeted printer driver does not support the automatic media type detection function (S107:NO), the PC 1 defines an initial value of "the type of placed paper" as "plain paper" since the targeted printer driver is not able to detect the media type of placed paper (S109). If the targeted printer driver supports the automatic media type detection function (S107:YES), the type of the placed paper is automatically detected by use of the automatic media type detection function of the targeted printer driver (S11).

Next, in step S113, the PC 1 checks whether the targeted printer driver supports an automatic paper size detection function for automatically detecting the size of placed paper. If the targeted printer driver does not support the automatic paper size detection function (S113:NO), the PC 1 defines an initial value of "the size of placed paper " as "A4" (or as "Letter") since the targeted printer driver is not able to detect the size of placed paper (S115). If the targeted printer driver supports the automatic paper size detection function (S113: YES), the size of the placed paper is automatically detected by use of the automatic paper size detection function of the targeted printer driver (S117).

Information registered (or defined) in the above mentioned printer driver registering process of FIG. 5 is stored in the hard disk drive of the PC 1 as a file, or stored in a registry. After the above mentioned printer driver registering process of FIG. 5 is finished for all of the printer drivers 21 to 25, the available setting values (which varies among the multifunction devices 11 to 15) for each of setting items of the media type, the paper size, the color and the printing quality are integrated as shown in FIG. 6.

Thus, a virtual printer (i.e., the integrated printer driver 41) having a name of "Integrated Printer" is constituted in the PC 1. Therefore, the user is allowed to operate the PC 1 as if the virtual printer having the integrated functions shown in FIG. 6 is connected to the PC 1. If the user instructs the PC 1 to print out data through the virtual printer (the integrated printer drive 41), one of the printer drivers 21 to 25 is selected based on settings targeted for the virtual printer and the selected printer driver operates to print out data through a corresponding one of the multifunction devices 11 to 15.

Next, a virtual printer setup process for setting up the virtual printer will be explained with reference to FIG. 7. The virtual printer setup process is executed under control of the CPU of the PC 1. The user may initiate the virtual printer setup process at any desired time. First, the PC 1 obtains the type of placed paper (S201). Specifically, in step S201, the type of placed paper defined in step S109 or S111 is obtained from the registered information (i.e., the Table shown in FIG. 6). Therefore, if a targeted printer driver does not support the automatic media type detection function, the media type of "plain paper" is obtained. If the targeted printer driver supports the automatic media type detection function, the media type detected by the targeted printer driver is obtained.

Figure 8:
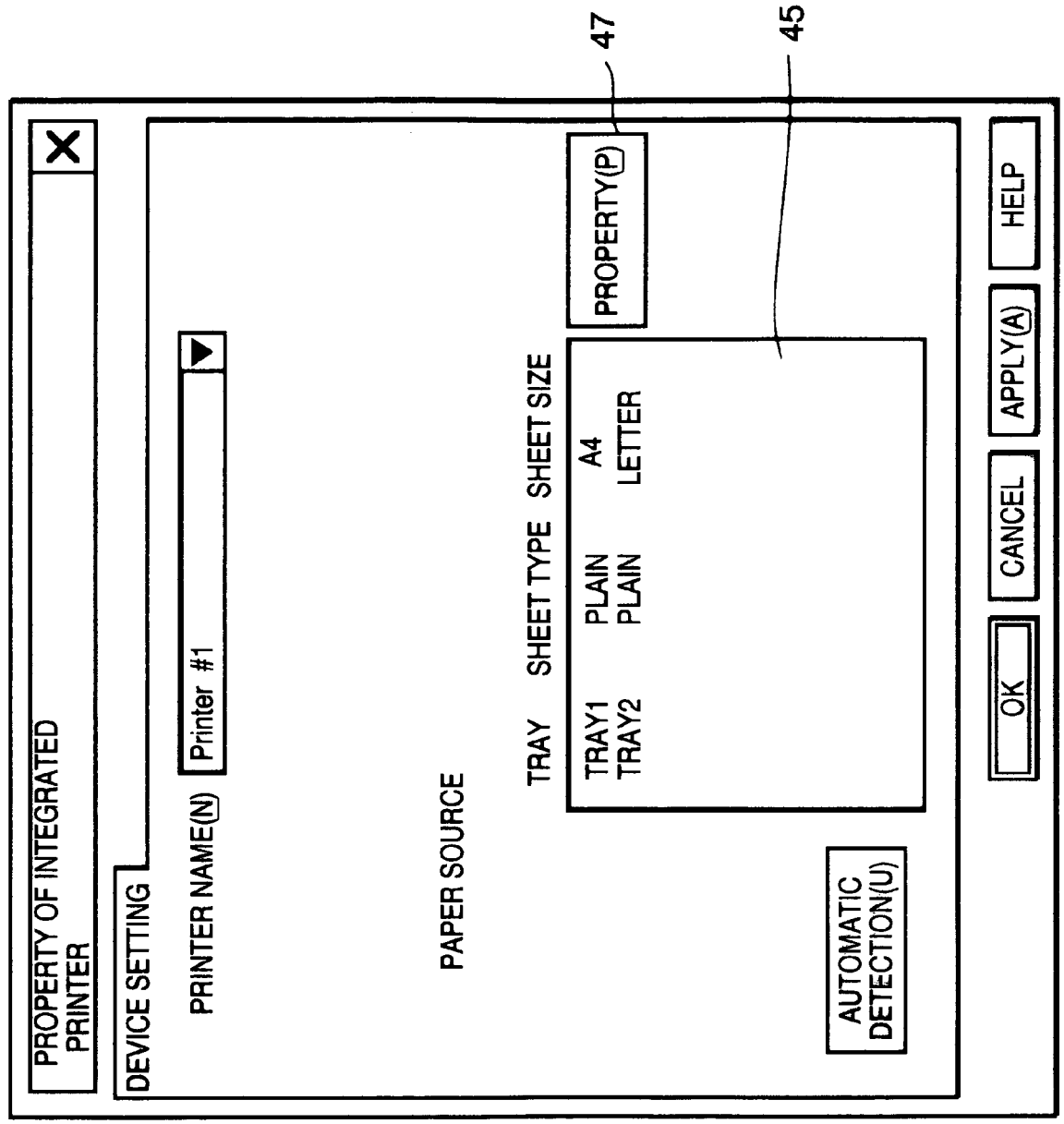
FIG. 8 shows an example a setting screen for the integrated printer driver.

The PC 1 may operate to display a setting screen (i.e., a UI (user interface) of the integrated printer driver 41) for allowing the user to designate the media type. FIG. 8 shows an example of the setting screen for the integrated printer driver 41. In the example of FIG. 8, the printer #1 has trays (tray 1 and tray 2). Setting values of the media type and the paper size are displayed in a paper feed setting field 45 of the setting screen. The user is allowed to designate or change setting values in the paper feed setting screen 45 by operating a property button 47 on the setting screen. By this structure, it becomes possible to define the type of placed paper correctly even if the printer driver does not have the automatic media type detection function.

Next, the PC 1 displays all of the available setting values of the media type (shown in FIG. 6) in such a manner that the type of paper actually placed is displayed on a screen in a normal indication state and the type of paper not actually placed is displayed in a warning indication state such that the user can recognizes the difference between the normal indication and the warning indication (S203). For example, at least one of the displaying color, the weight or size of a character may be different between the normal indication and the warning indication. Alternatively, an attention mark may be added to the media type displayed in the warning indication state.

Next, the PC 1 obtains the size of placed paper (S205). Specifically, in step S205, the size of placed paper defined in step S115 or S117 is obtained from the registered information (i.e., the Table shown in FIG. 6). Therefore, if the targeted printer driver does not support the automatic paper size detection function, the paper size of "A4" (or "Letter") is obtained. If the targeted printer driver supports the automatic paper size detection function, the paper size detected by the targeted printer driver is obtained.

If the targeted printer driver does not support the automatic paper size detection function, a setting screen (i.e., a user interface of the integrated printer driver) like the setting screen shown in FIG. 8 may be displayed for allowing the user to designate setting values for the paper size.

Next, the PC 1 displays all of the available setting values of the paper size (shown in FIG. 6) in such a manner that the size of paper actually placed is displayed on a screen in a normal indication state and the type of paper not actually placed is displayed in a warning indication state so that the user can recognize the difference between the normal indication and the warning indication (S207).

Next, if printers which support the color (color/gray scale) and the designated media type and the paper size exist, the PC 1 displays all the available setting values of the color (color/gray scale) on the screen in such a manner that setting values of the color supported by the printers (the printer drivers) are displayed in a normal indication state and the setting values of the color not supported by the printers (other printer drivers) are displayed in a warning indication state (S209) such that the user can recognize the difference between the normal indication and the warning indication (S209).

Next, if printers which support the color (color/gray scale) and the printing quality and the designated media type and the paper size exist, the PC 1 displays all the available setting values of the printing quality on the screen in such a manner that setting values of the printing quality supported by the printers (the printer drivers) are displayed in a normal indication state and the setting values of the printing quality not supported by the printers (other printer drivers) are displayed in a warning indication state such that the user can recognize the difference between the normal indication and the warning indication (S211).

Next, if printers which support the color (color/gray scale) and the printing quality and the designated media type and the paper size exist, the printers are displayed in a normal indication state and the other printers are displayed in a warning indication state such that the user can recognize the difference between the normal indication and the warning indication (S213).

Figure 7:
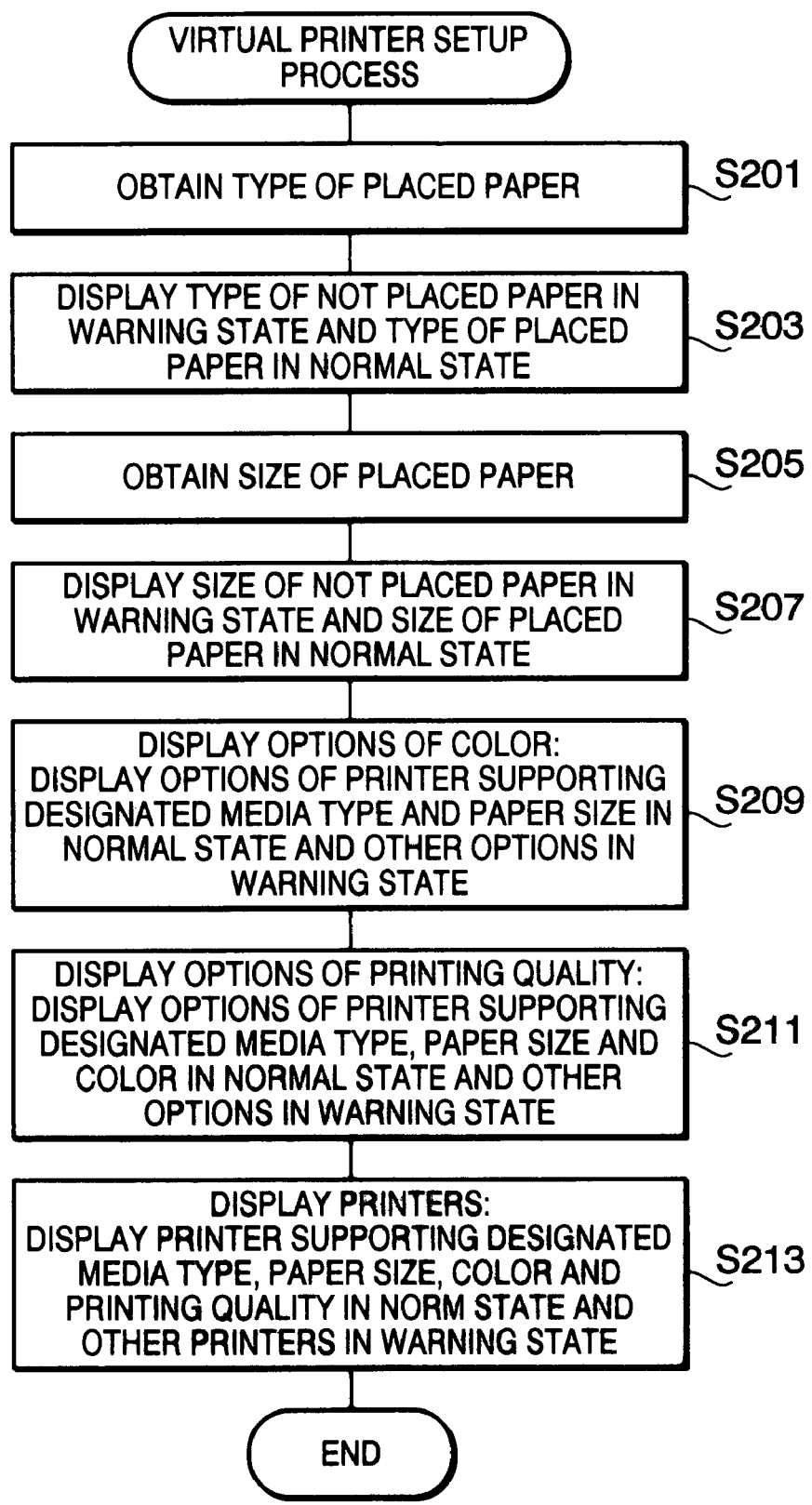
FIG. 7 is a flowchart illustrating a virtual printer setup process for setting up a virtual printer.
Figure 9:
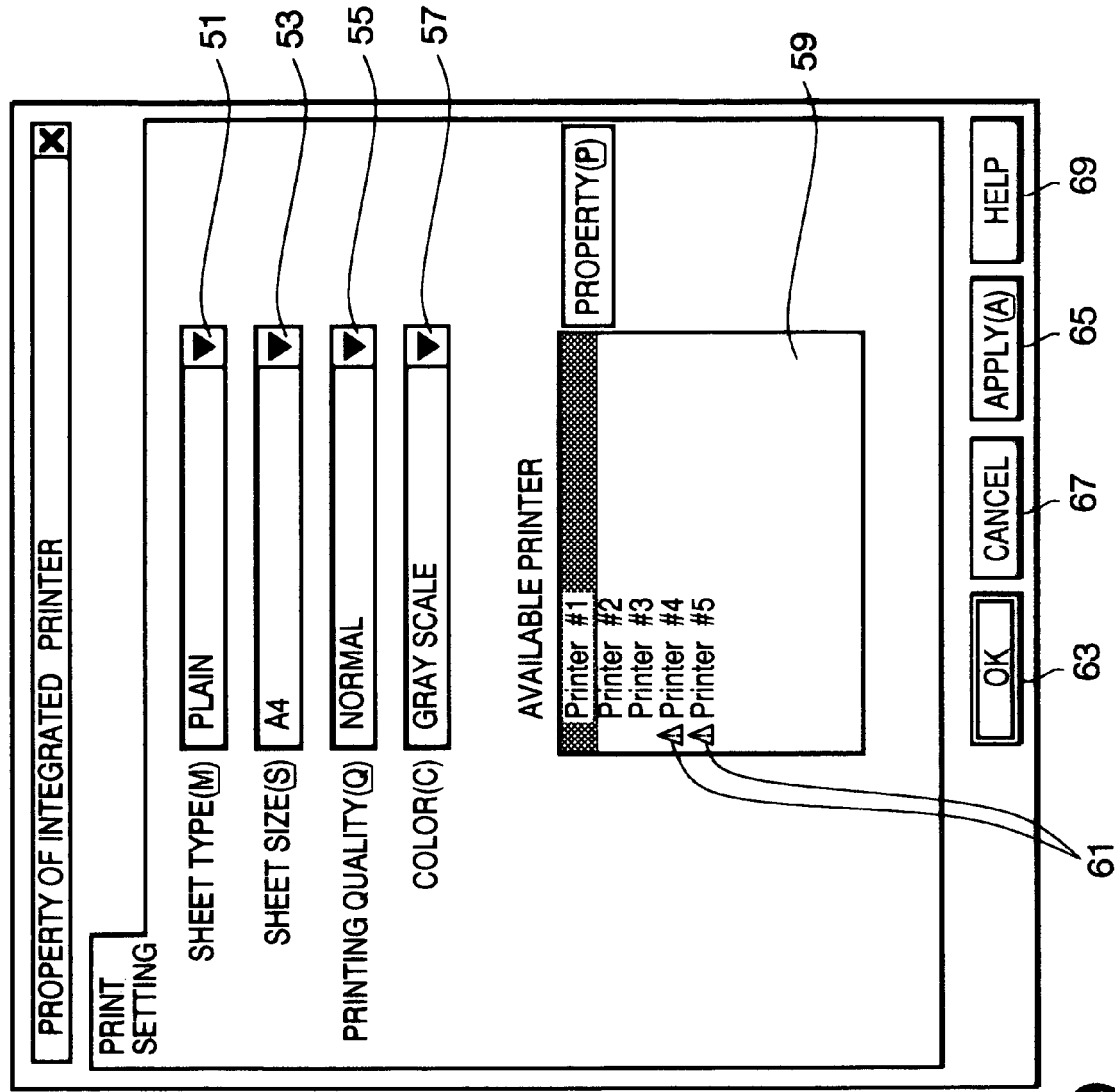
FIGS. 9 and 10 show examples of a virtual printer setting screen.

Through the virtual printer setup process shown in FIG. 7, a virtual printer setting screen shown in FIG. 9 is displayed on the screen. On the virtual printer setting screen of FIG. 9, a media type selection field 51, a paper size selection field 53, a printing quality selection field 55, a color selection field 57, and a printer selection field 59 are displayed. In the fields 51, 53, 55, 57 and 59, setting options (setting values) generated in steps S203, S207, S209, S211 and S213 can be listed, respectively.

For example, five printer names (printer #1 to printer #5) are displayed on the printer selection field 59 in such a manner that two of them are displayed with attention marks 61 as the warning indication state and three of them are displayed without attention marks as the normal indication state. In this case, the printer (name) displayed in the normal indication state supports a combination of setting values currently designated in the fields of 51, 53, 55, and 57. The printer (name) displayed in the warning indication state does not support the combination of setting values currently designated in the fields of 51, 53, 55, and 57.

"OK" button 63, "Cancel" button 67, "Apply" button 65 and "Help" button 69 are displayed on the virtual printer setting screen. By pressing the "OK" button 63 or "Apply" button 65, setting options currently designated in the fields of 51, 53, 55, 57 and 59, respectively, on the virtual printer setting screen are applied to the virtual printer. The "Cancel" button 67 is used to disable the setting options designated on the virtual printer setting screen. The "Help" button is used to display explanations about the virtual printer setting screen.

As shown in FIG. 9, each of the fields 51, 53, 55 and 57 supports a drop down menu. Specifically, by clicking a right end of each field, available setting options (setting values) can be displayed in the drop down menu simultaneously.

If the user redoes selection of options in one (or more) of the fields 51, 53, 55 and 57, information in the printer selection field 59 is refreshed. That is, positions of attention marks 61 (and/or the number of attention marks 61) identifying printers not supporting the newly designated options will probably be changed. In such a case, in accordance with the change of the attention marks, a representative printer supporting the newly designated options is selected again and the printer name of the selected printer is highlighted by changing the display (see "Printer #5" in FIG. 10).

It should be noted that attention marks are added to options in each of the drop down menus of the fields 51, 53, 55 and 57 if options to be displayed in the warning indication state exist in these drop down menus.

As described above, by selecting one of setting options in each of the fields 51, 53 55 and 57, one or more printers supporting the selected setting options are highlighted in the printer selection field 59. In addition to or as an alternative to such a configuration, the virtual printer setting screen may be configured such that when the user selects a printer from among the printers displayed in the printer selection field 59, setting options which the user selected printer supports are displayed in each of the fields 51, 53, 55 and 57. In this case, the setting options which the user selected printer supports may be displayed simultaneously, for example, by a drop down menu in each field. By simply selecting a printer, the user can know setting options that the selected printer supports.

Figure 11:
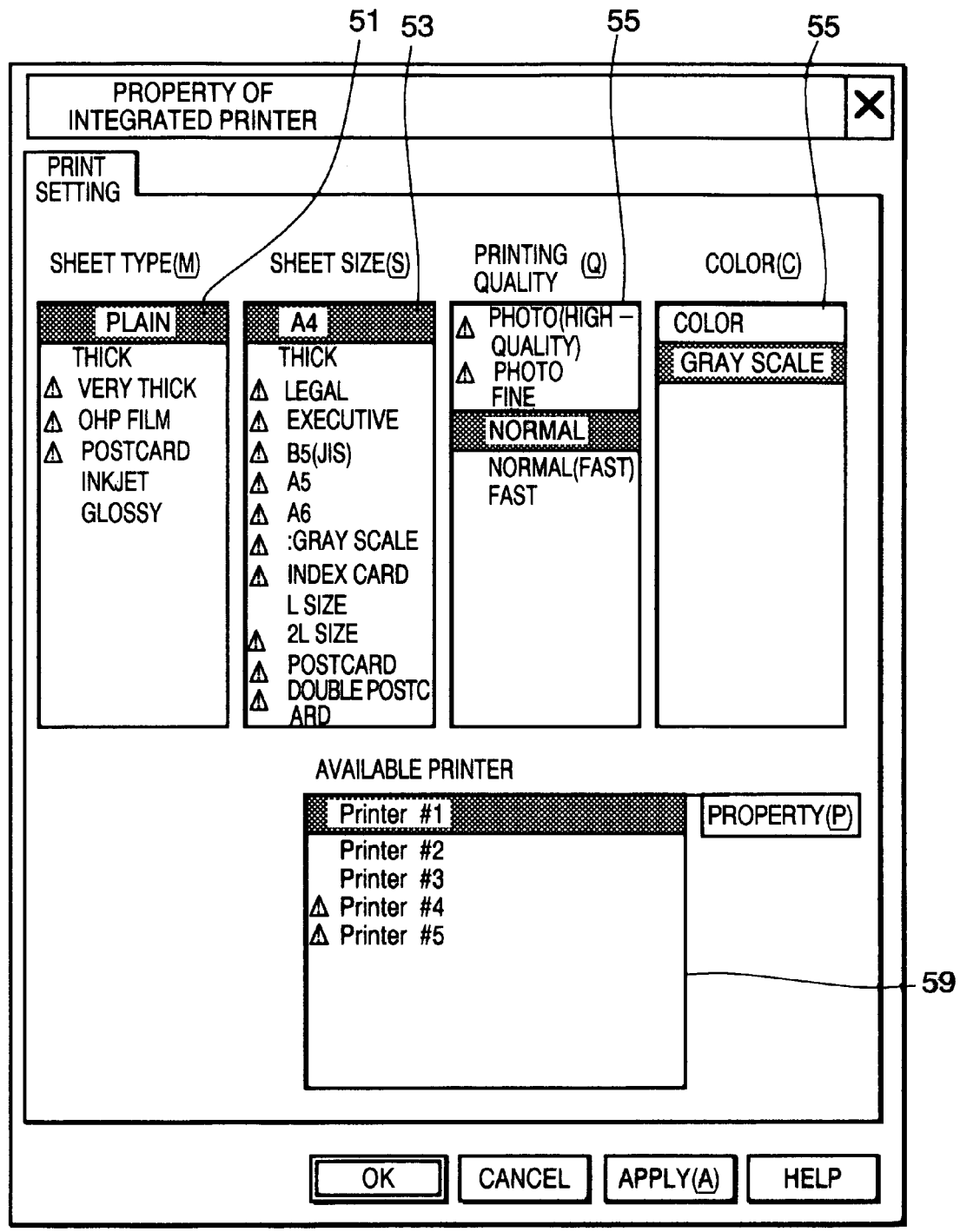
FIG. 11 shows a variation of the virtual printer setting screen.

As an alternative to the representation of available setting options by use of the drop down menu, the virtual printer setting screen may be configured such that all of the available setting options of each of the media type selection field 51, the paper size selection field 53, the printing quality selection field 55, the color selection field 57, and the printer selection field 59 are displayed in a list box format as shown in FIG. 11. By this configuration, if the number of setting options to be included in one of the fields 51, 53, 55 and 57 does not exceed the predetermined number, all of the setting options can be displayed simultaneously in each of the fields 51, 53, 55 and 57.

As described above, by selecting one of the setting options for each of the fields 51, 53, 55 and 57, selecting one of printer names in the printer selection field 59, and pressing the "OK" button on the virtual printer setting screen, the integrated printer driver operates to pass the setting option designated in each of the fields of 51, 53, 55 and 57 to the printer driver corresponding to the printer name designated in the printer selection field 59. If print data to be printed out is passed to the virtual printer (integrated printer driver 41) from an application program running on the PC 1, the print data is passed to the printer driver designated in the virtual printer setting screen, and is passed to the printer (multifunction device) corresponding to the designated printer driver.

Figure 10:
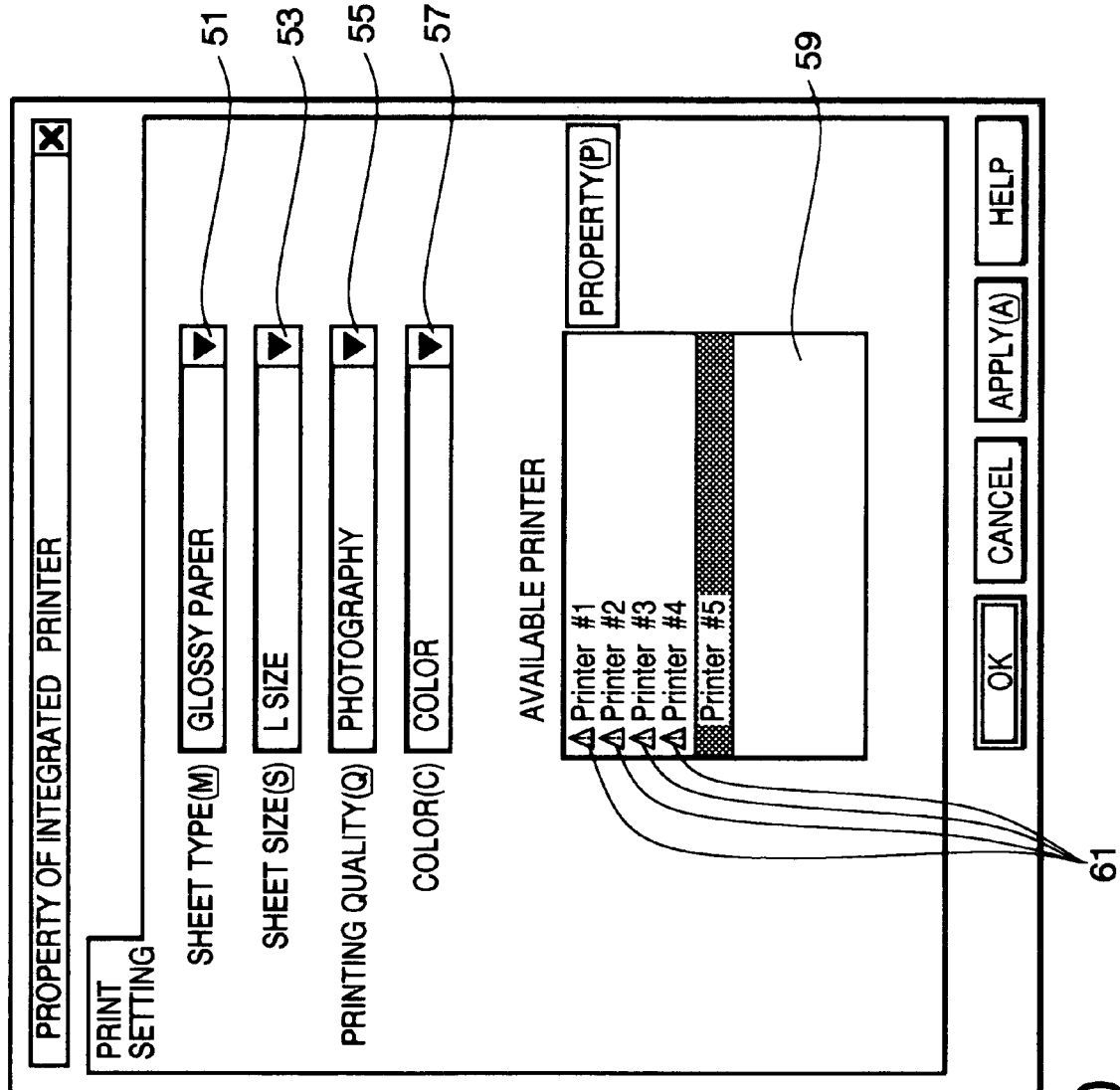

As described above, on the virtual printer setting screen as a user interface of the integrated printer driver 41, all of the available setting options which at least one of the multifunction devices 11 to 15 supports are displayed simultaneously through the virtual printer setting screen shown in FIG. 10 or 11. Therefore, the user can view all of the available setting options which can be applied to at least one of the multifunction devices simultaneously through the virtual printer setting screen. That is, the user is allowed to select a desirable setting value from among all of available setting options which can be applied to at least one of the multifunction devices 11 to 15.

After the user selects a desirable setting value for each of the fields of 51, 53, 55 and 57, available printer names supporting the user selected setting values are highlighted. Therefore, it is possible to select a desirable one of the available printers supporting the setting values designated by the user.

According to the illustrative embodiment, it becomes possible to avoid occurrence of a problem that the user undesirably repeats selection of the printer (printer driver) until the user finds the printer (printer driver) which supports desirable setting values.

As described above, the virtual printer setting process shown in FIG. 7 can be initiated by the user at any desired time. In the virtual printer setting process, the printer driver designated by the user is selected as a target printer driver (i.e., a target printer), and then the setting options designated in the virtual printer setting process are applied to the selected printer driver, After the virtual printer setting process has been completed, the user can print out images from the target printer by simply stating a printing operation.

However, the virtual printer setting process may be configured to start automatically at a time at which the user starts a printing operation. In this case, after the virtual printer setting process is finished, the printing is executed on a target printer which has been designated in the virtual printer setting process. It is understood that in such a configuration the user does not need to initiate the virtual printer setting process, and therefore the user is allowed to print out images on a desired printer supporting desirable settings at any desired time.

Next, a process for registering the scanner drivers 31 to 35 in the integrated scanner driver 43 will be explained with reference to FIG. 12. The scanner driver registering process is executed by the PC 1. The scanner driver registering process may be initiated at anytime. However, it is preferable that the scanner driver registering process is initiated at a time at which each scanner driver is installed in the PC 1 if the network system is designed such that the registration of all of the scanner drivers 31 to 35 is essential. Alternatively, the user may initiate the scanner driver registering process at any desired time if the network system is designed such that the registration of all of the scanner drivers 31 to 35 is not essential, or the scanner driver registering process may be initiated when the initiation of one of (or all of) the multifunction devices 11 to 15 is detected.

Figure 12:
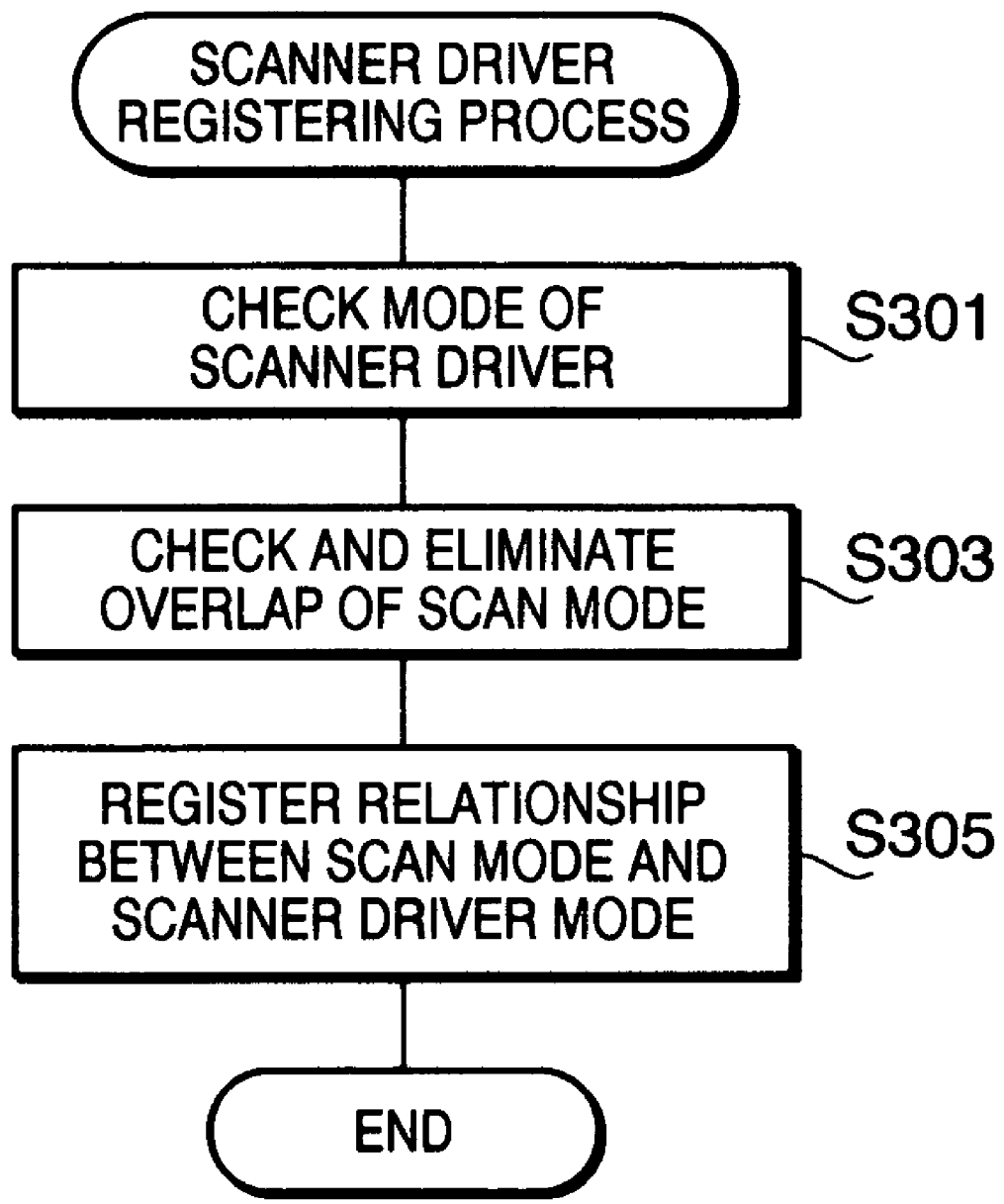
FIG. 12 is a flowchart illustrating a scanner driver registering process for registering scanner drivers in an integrated scanner driver.

As shown in FIG. 12, first, the PC 1 checks scanning modes (i.e., setting values) of a scanner driver (i.e., a targeted scanner driver) to be added to the integrated scanner driver 43 (step S301). Specifically, in step S301, available setting values for each setting item (e.g., the resolution, the number of colors, or the type of feeding) of the targeted scanner driver are obtained (listed). For example, with regard to the resolution, eight setting values are listed for the multifunction device 11 (see FIG. 4), and ten setting values are listed for the multifunction device 13 (see FIG. 4). Such a checking process for the scanning modes is performed for all of the other setting items (i.e., for the number of colors, and the type of feeding).

Next, the PC 1 checks whether overlap among the scanning modes exists or not, and eliminates overlaps of the scanning modes (S301). Specifically, in step S301, if a setting value obtained in step S301 and a setting value which has been obtained (listed) in step S301 in the previously executed scanner driver registering process are equal to each other, one of the same setting values is deleted. For example, if eight kinds of resolutions (see FIG. 4) are listed as setting values for the setting item of resolution in step S301 in the past scanner driver registering process executed for the multifunction device 11, and ten kinds of resolutions (see FIG. 4) are listed as setting values for the setting item of resolution in step S301 in the subsequent scanner driver registering process executed for the multifunction device 13, eight kinds of resolutions other than "4800×4800 dpi" and "9600×9600 dpi" are redundant. Therefore, in this case, overlaps of setting values regarding the eight kinds of resolutions are eliminated.

Next, in step S305, the PC 1 registers the relationship between the setting values collected and consolidated in step S303 and setting values which each scanner driver supports. For example, if ten kinds of resolutions are listed in step S303 as available setting values for the setting item of resolution, all of the ten kinds of resolutions are defined as available setting values for the multifunction device 12. Such a registering operation is performed for each of the remaining setting items (e.g., the number of colors and the type of feeding).

Information registered (or defined) in the above mentioned scanner driver registering process of FIG. 12 is stored in the hard disk drive of the PC 1 as a file, or stored in a registry. After the above mentioned scanner driver registering process of FIG. 12 is finished for all of the scanner drivers 31 to 35, the available setting values (which varies among the multifunction devices 11 to 15) for each of the setting items of the resolution, the number of colors, and the type of feeding are integrated as shown in FIG. 13.

Thus, a virtual scanner (i.e., the integrated scanner driver 43) having a name of "Integrated Scanner" is constituted in the PC 1. Therefore, the user is allowed to operate the PC 1 as if the virtual scanner having the integrated options shown in FIG. 13 is connected to the PC 1. If the user instructs the PC 1 to read an image, one of the scanner drivers 31 to 35 is selected based on the setting options targeted for the integrated scanner, and the selected scanner driver controls corresponding to one of the multifunction devices 11 to 15 to scan an image.

Next, a virtual scanner setup process for setting up the virtual scanner will be explained with reference to FIG. 14. The virtual scanner setup process is executed under control of the CPU of the PC 1. The user may initiate the virtual scanner setup process at any desired time. First, the PC 1 displays the available resolutions which the virtual scanner supports (S401). In this illustrative embodiment, ten kinds of resolutions shown in FIG. 13 are displayed.

Next, the PC 1 displays all of the selectable options as the setting item of the number of colors in such a manner that options corresponding to scanners (scanner drivers) supporting both of the designated resolution and the number of colors are displayed in the normal indication state and that options corresponding to the remaining scanners (scanner drivers) are displayed in the warning indication state (S403). The information is represented so that the user can notice the difference between the normal indication and the warning indication.

Next, the PC 1 displays all of the selectable options as the setting item of the type of feeding in such a manner that options corresponding to scanners (scanner drivers) supporting all of the designated resolution, the number of colors and the type of feeding are displayed in the normal indication state and that options corresponding to the remaining scanners (scanner drivers) are displayed in the warning indication state (S405). The information is represented so that the user can notice the difference between the normal indication and the warning indication.

Figure 14:
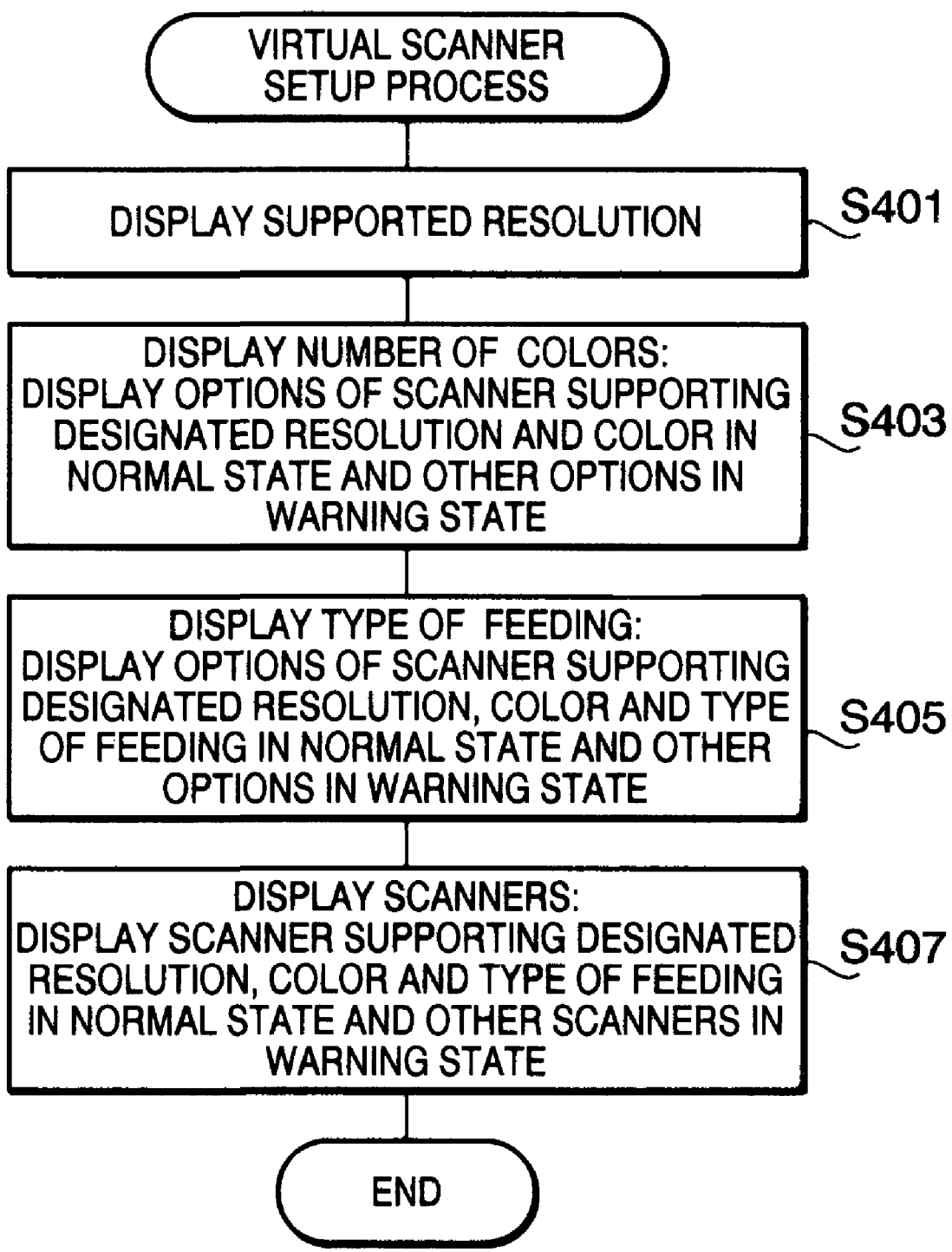
FIG. 14 is a flowchart illustrating a virtual scanner setup process for setting up a virtual scanner.
Figure 15:
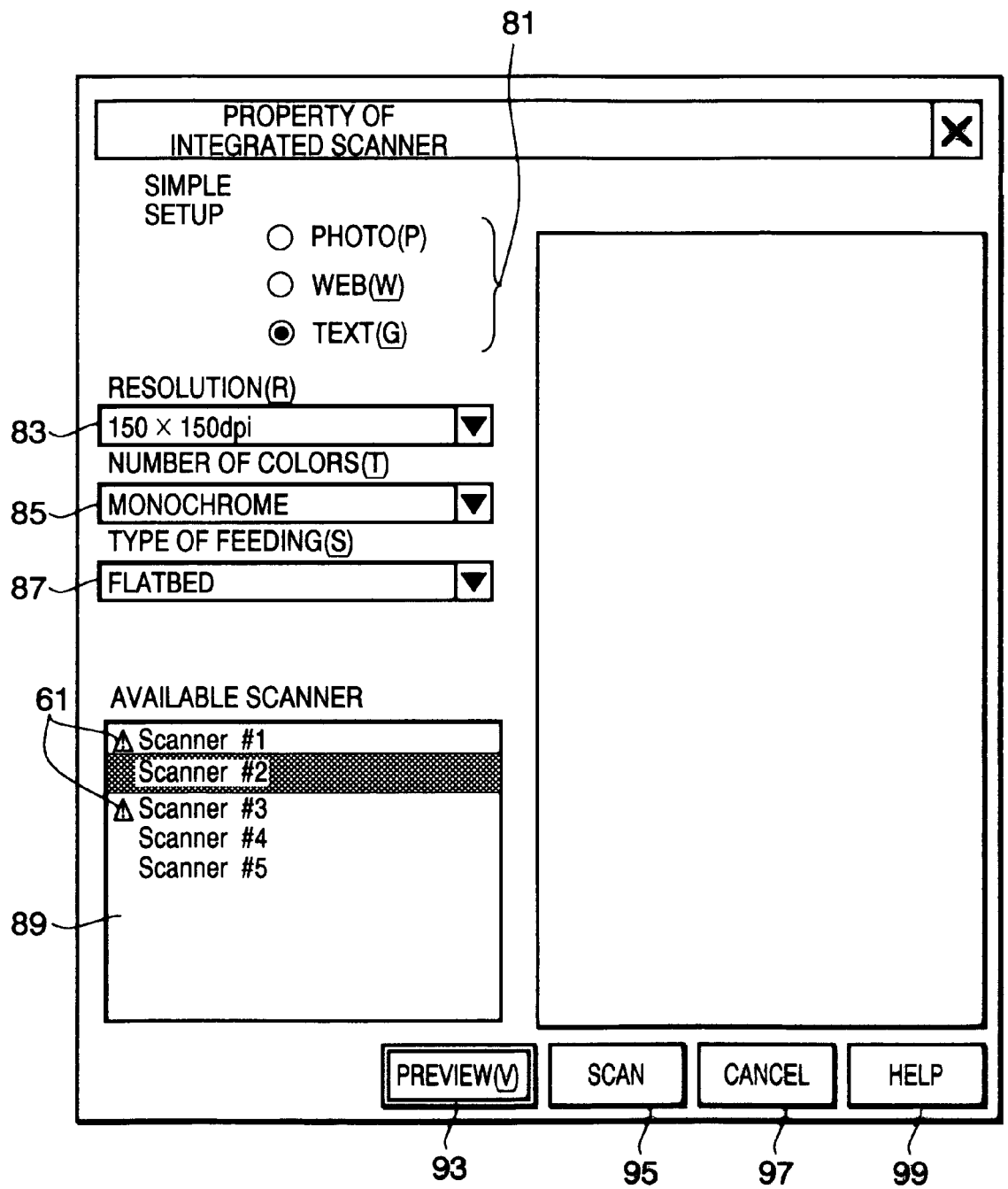
FIGS. 15 and 16 show examples of a virtual scanner setting screen.

Through the virtual scanner setup process shown in FIG. 14, a virtual scanner setting screen shown in FIG. 15 is displayed on the screen. On the virtual scanner setting screen of FIG. 15, a simple setting selection field 81, a resolution selection field 83, a number of colors selection field 85, a type of feeding selection field 87, and a scanner selection field 89 are displayed. In the fields of 81, 83, 85, 87 and 89, setting options (setting values) generated in steps S401, S403, S405 and S407 are listed, respectively.

For example, five scanner names (scanner #1 to scanner #5) are displayed on the scanner selection field 89 in such a manner that attention marks 61 are added to two of the scanners as a warning indication and three of the scanners are displayed without attention marks 61 as a normal indication. In this case, the scanner (name) displayed by the normal indication supports a combination of setting items currently designated in the fields of 83, 85, and 87. The scanner (name) displayed by the warning indication does not support the combination of setting items currently designated in the fields of 83, 85 and 87.

"Preview" button 93, "Scan" button 95, "Cancel" button 97 and "Help" button 99 are displayed on the virtual scanner setting screen. By pressing the "Preview" button 93 or "Scan" button 95, a scanning operation is performed according to the current setting values defined in the fields of 81, 83, 85, 87 and 89. The "Cancel" button 97 is used to disable the setting options designated on the virtual scanner setting screen. The "Help" button 99 is used to display explanations about the virtual scanner setting screen.

If the user redoes selection of options in one (or more) of the fields 81, 83, 85 and 87, information in the scanner selection field 89 is refreshed. That is, positions of attention marks 61 (and/or the number of attention marks 61) identifying scanners not supporting the newly designated options will probably be changed. In such a case, in accordance with the change of the positions of the attention marks 61, a representative printer supporting the newly designated options is selected again and the scanner name of the selected printer is highlighted by changing the display (see "Scanner #3" in FIG. 16).

It should be noted that attention marks are added to options in each of the drop down menus of the fields 85 and 87 if options to be displayed by the warning indication exist in these drop down menus.

As described above, selectable options which at least one of the multifunction devices 11 to 15 supports are displayed in the virtual scanner setting screen simultaneously.

Figure 16:
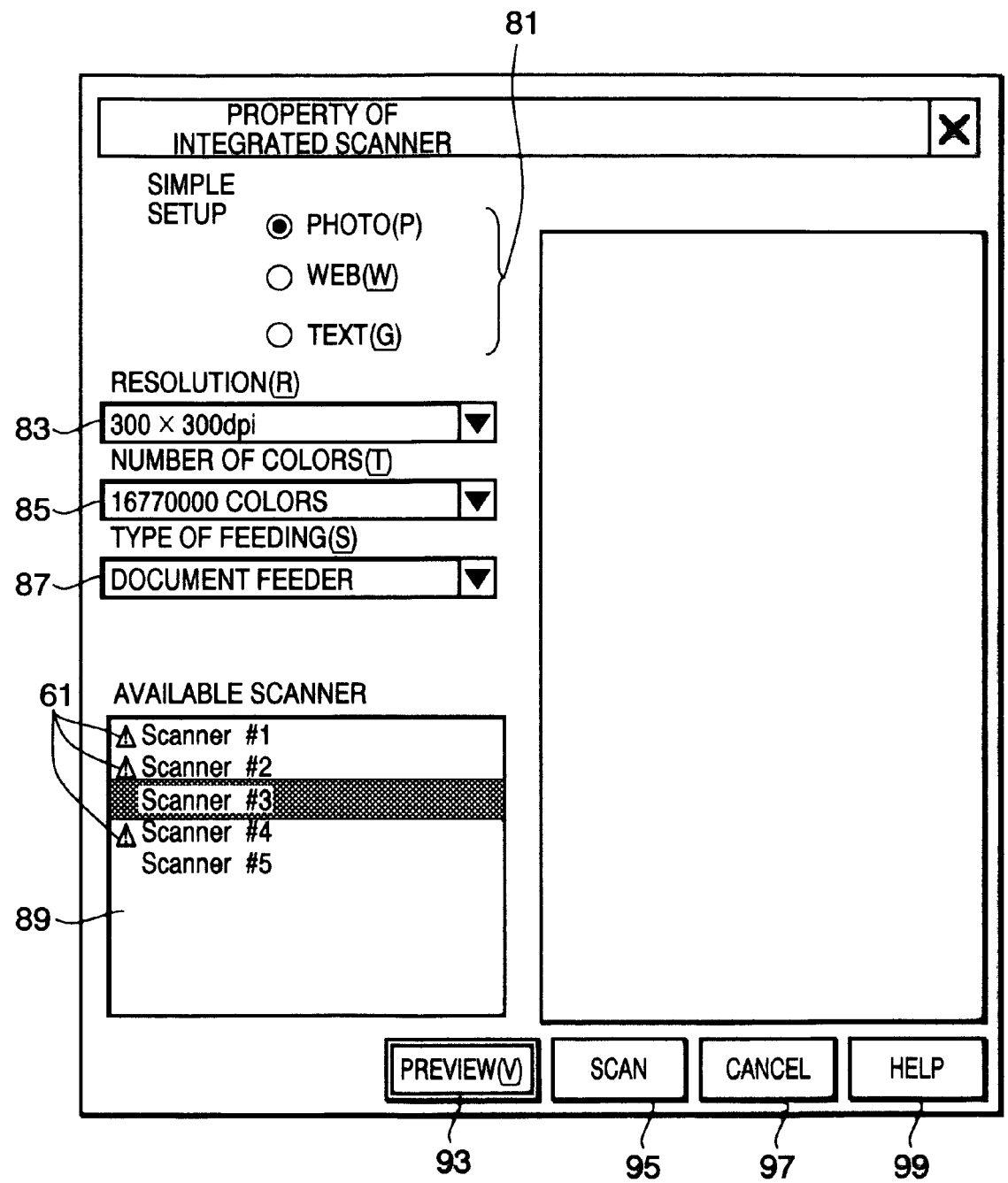

As described above, on the virtual scanner setting screen formed as a user interface of the integrated scanner driver 43, all of the available setting options which at least one of the multifunction devices 11 to 15 supports are displayed simultaneously through the virtual scanner setting screen shown in FIG. 15 or 16. Therefore, the user can view all of the available setting options simultaneously through the virtual scanner setting screen. That is, the user is allowed to select desirable setting value from among all of the available setting options.

As described above, by selecting one of setting options in each of the fields 83, 84 and 85, one or more scanners supporting the selected setting options are highlighted in the scanner selection field 89. In addition to or as an alternative to such a configuration, the virtual scanner setting screen may be configured such that when the user selects a scanner from among the scanners displayed in the scanner selection field 89, setting options which the user selected scanner supports are displayed in each of the fields 83, 85 and 87. In this case, the setting options which the user selected scanner supports may be displayed simultaneously, for example, by a drop down menu in each field. By simply selecting a scanner, the user can know setting options that the selected scanner supports.

According to the illustrative embodiment, it becomes possible to avoid occurrence of a problem that the user undesirably repeats selection of the scanner (scanner driver) until the user finds the scanner (scanner driver) which supports desirable setting values.

Although the present invention has been described in considerable detail with reference to certain illustrative embodiments thereof, other embodiments are possible.

For example, the network system shown in FIG. 1 may be provided with printers and scanners in place of the multifunction devices 11 to 15.

It is understood that the present invention may be applied to a network system provided with a plurality of image forming devices and/or a plurality of image reading devices.

Hereafter, a variation of a virtual printer set up process shown in FIG. 7 will be explained with reference to FIG. 17 to FIG. 20. In FIGS. 17 to 20, to elements which are substantially the same as those shown in the above mentioned embodiment, the same reference numbers are assigned and explanations thereof will not be repeated. In this variation, a user interface is provided so as to allow a user to designate a plurality of setting options for all of the setting items at a time.

Figure 17:
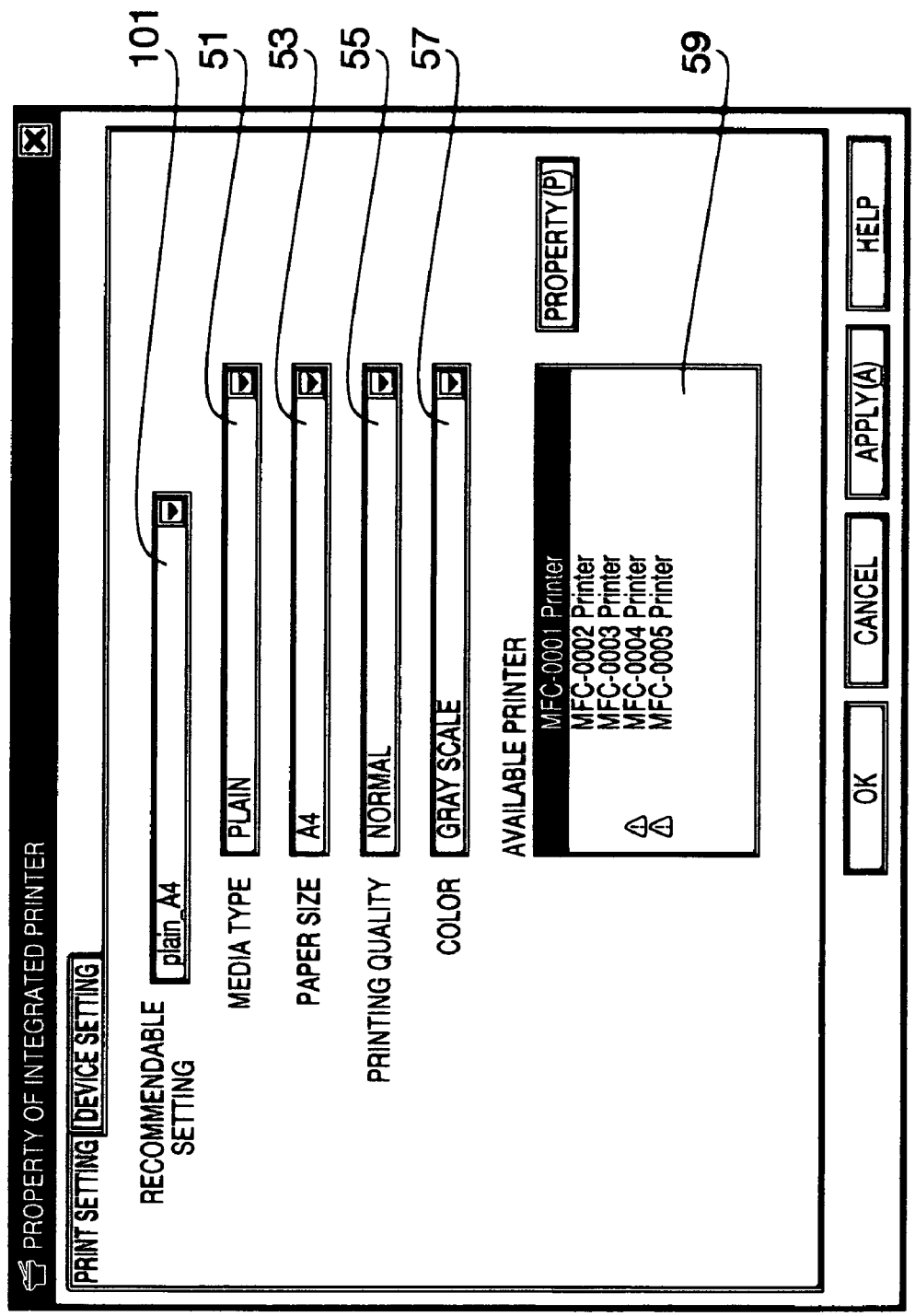
FIG. 17 shows a virtual printer setting screen according to a variation of an embodiment.

FIG. 17 shows a virtual printer setting screen according to this variation. As shown in FIG. 7, the virtual printer setting screen has a "recommendable settings" field 101. In this field 101, a plurality of recommendable settings (i.e., combinations of setting options) are displayed in a pull down menu by clicking a mark at a right end portion of the field 101. Actually, in the recommendable settings field 101, combinations of setting options supported by the printers listed in the printer selection field 59 are listed. FIG. 18 shows examples of the recommendable settings. In FIG. 18, eleven recommendable settings supported by the printers (MFC-0001 Printer, MFC-0002 Printer, MFC-0003 Printer, MFC-0004 Printer and MFC-0005 Printer) are shown.

As shown in FIG. 18, a recommendable setting "plain_A4" is a combination of a tray "tray 1", a media type "plain", a paper size "A4", a color "gray scale" and printing quality of "normal". It is understood by simply selecting one of recommendable settings from the field 101, all of the setting items of the tray, media type, paper size, color and printing quality can be designated simultaneously. Therefore, the user is not required to select one of setting options for all of the setting items.

As shown in FIG. 18, another setting (e.g., "2in1") may be added to the combination of setting options. Fewer or more setting items than that shown in FIG. 18 may be used in each combination of setting options.

The recommendable settings that each of the printers (MFC-0001 Printer, MFC-0002 Printer, MFC-0003 Printer, MFC-0004 Printer and MFC-0005 Printer) are shown in FIG. 19. As shown in FIG. 19, the MFC-0001 Printer supports three recommendable settings of "plain_A4", "plain_letter" and "plain_A4_2in1". The MFC-0002 Printer supports three recommendable settings of "plain_A4", "plain_letter" and "plain_4_fast". The MFC-0003 Printer supports four recommendable settings of "plain_A4_color", "glossy_photo L_color", "plain_A4_color_2in1" and "postcard_color". The MFC-0004 Printer supports three recommendable settings of "plain_A4_color", "inkjet_A4", and "plain_A4_color_2in1". The MFC-0005 Printer supports four recommendable settings of "plain_A4_color", "glossy photo L", "plain A4_color_2in1" and "glossy_photo L_frameless".

Figure 20:
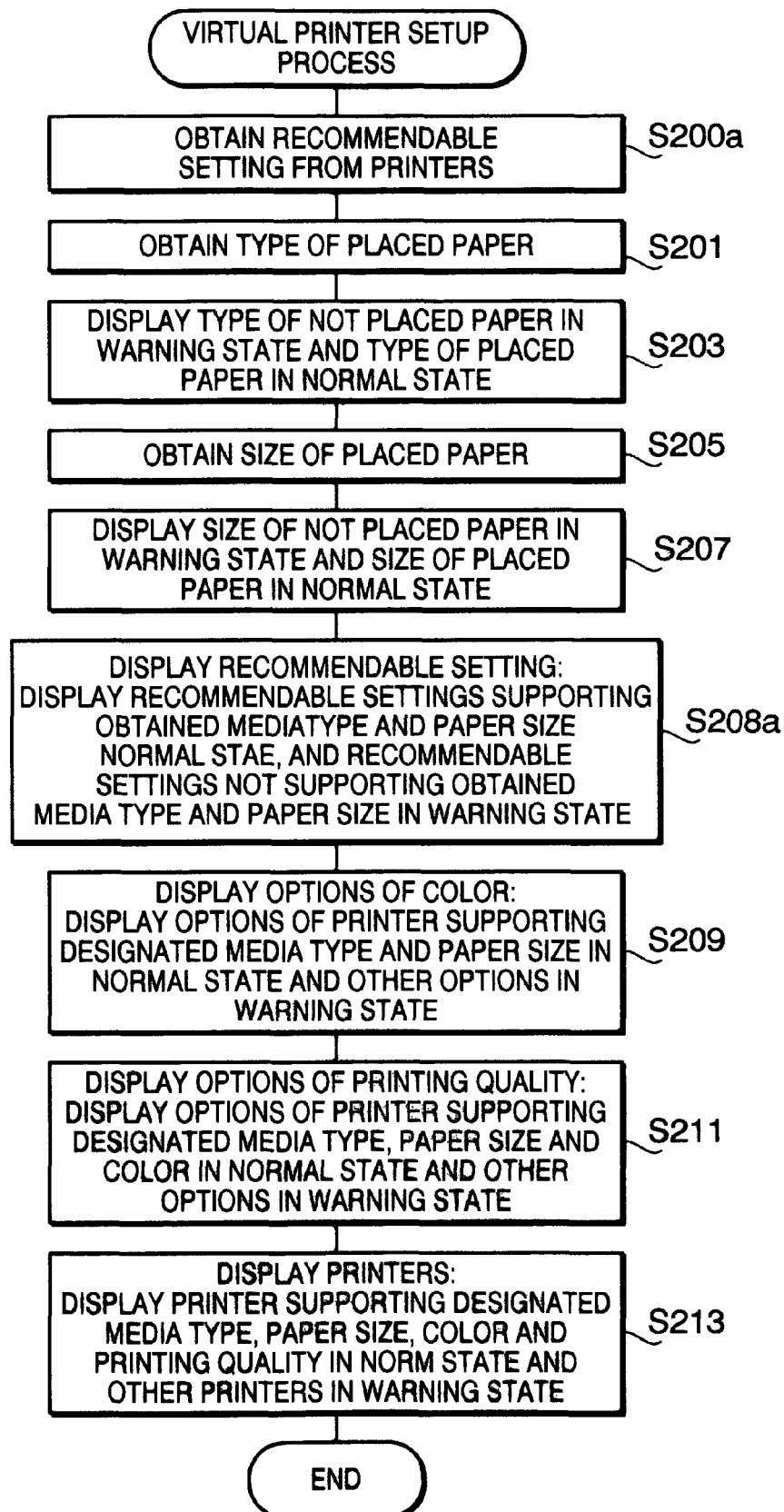
FIG. 20 is a flowchart illustrating a virtual printer setup process according to the variation of the embodiment.

FIG. 20 is a flowchart illustrating the virtual printer setup process according to the variation. Since steps other than S200a and S208a of FIG. 20 are the same as those shown in FIG. 7, only the feature of FIG. 20 (i.e., steps of S200a and S208a) will be explained. In step S200a, recommendable settings registered in each of the printers (MFC-0001 Printer, MFC-0002 Printer, MFC-0003 Printer, MFC-0004 Printer and MFC-0005 Printer) are obtained from the printers.

Then, control proceeds to step S201. After step S207 is finished, control proceeds to step S208a where recommendable settings that supports the media type and the size obtained in steps S201 and S203 are displayed in a normal state, and recommendable settings that do not support the media type and the size obtained in steps S201 and S203 are displayed in a warning state. After the user selects one of recommendable settings in the field 101, the setting options of the selected recommendable setting may be displayed in the field of 51, 53 55 and 57, respectively, so that the user can checks whether each setting option matches with an intended option.

In the above mentioned explanation, the recommendable settings are obtained from the printers in step S200a. However, the recommendable settings may be stored in the virtual printer driver in advance. In this case, it is possible to user the recommendable setting stored in the virtual printer driver in the process of step S208a.

What is claimed is:

1. A method of setting up an operating state for a plurality of predetermined devices, the method being carried out by a terminal device to which the plurality of predetermined devices are connected, the method comprising the steps of:

collecting, by the terminal device, from all of the plurality of predetermined devices, all setting options and further setting options, each of the collected setting options being supported by at least one of the plurality of predetermined devices as an option of a setting item and each of the collected further setting options being supported by at least one of the plurality of predetermined devices as an option of a further setting item;

displaying, by the terminal device, without selecting one of the plurality of predetermined devices, an interface element configured to receive a selection of a setting option for the setting item, wherein only the collected setting options are displayed in the interface element in a user-selectable state;

displaying, by the terminal device, all of the collected further setting options of the further setting item without selecting one of the plurality of predetermined devices, together with displaying all of the collected setting options of the setting item;

receiving, by the terminal device, a user selection of one of the displayed setting options of the setting item through the interface element;

identifying, by the terminal device, each device supporting the selected one of the setting options of the setting item, from the plurality of predetermined devices, responsive to the user selection;

judging, by the terminal device, prior to selection of one or more of the further setting options, whether each of the further setting options is selectable in response to the user selection of the one of the displayed setting options different from the further settings options, wherein judging whether each of the further setting options is selectable includes:

determining that a further setting option is selectable in response to determining that one or more of the plurality of predetermined devices supports a combination of the selected one of the displayed setting options and the further setting option; and determining that the further setting option is not selectable in response to determining that none of the plurality of predetermined devices support a combination of the selected one of the displayed setting options and the further setting option, displaying, by the terminal device, selectable further setting options, judged to be selectable by the judging step, in a first displaying state; and displaying, by the terminal device, non-selectable further setting options, judged to be not selectable in the judging step, in a second displaying state different from the first displaying state.

2. The method according to claim 1, further comprising a step of displaying each device identified in the identifying step in a third displaying state.

3. The method according to claim 2, further comprising a step of displaying remaining devices, of the plurality of predetermined devices, not identified in the identifying step in a fourth displaying state different from the third displaying state.

4. The method according to claim 3, wherein the fourth displaying state is a state in which each of the remaining devices is displayed with an attention mark.

5. The method according to claim 2, wherein the third displaying state is a highlighted state.

6. The method according to claim 1, wherein each of the plurality of predetermined devices includes an image forming device.

7. The method according to claim 6, wherein the setting item includes one of a media type, a paper size, color and printing quality.

8. The method according to claim 1, wherein each of the plurality of predetermined devices includes an image reading device.

9. The method according to claim 8, wherein the setting item includes one of resolution, a number of colors, and a type of feeding.

10. The method according to claim 1, wherein the judging in the judging step is conducted further based on states of the plurality of predetermined devices.

11. The method according to claim 1, wherein the second displaying state is a state in which each of the non-selectable further setting options judged to be not selectable is displayed with an attention mark.

12. The method according to claim 1, further comprising a step of receiving a user's further selection of one of the selectable further setting options of the further setting item, wherein at least one device supports both the selected one of the setting options and the selected one of the further setting options.

13. A non-transitory computer readable storage medium storing computer readable instructions, which when executed cause a computer to carry out a method of setting up an operating state for a plurality of predetermined devices, the method comprising the steps of:

collecting, from all of the plurality of predetermined devices, all setting options and further setting options, each of the collected setting options being supported by at least one of the plurality of predetermined devices as an option of a setting item and each of the collected further setting options being supported by at least one of the plurality of predetermined devices as an option of a further setting item;

displaying, without selecting one of the plurality of predetermined devices, an interface element configured to receive a selection of a setting option for the setting item, wherein only the collected setting options are displayed in the interface element in a user-selectable state;

displaying all of the collected further setting options of the further setting item without selecting one of the plurality of predetermined devices, together with displaying all of the collected setting options of the setting item;

receiving a user selection of one of the displayed setting options of the setting item through the interface element;

identifying each device supporting the selected one of the setting options of the setting item, from the plurality of predetermined devices, responsive to the user selection;

judging, prior to selection of one or more of the further setting options, whether each of the further setting options is selectable in response to the user selection of the one of the displayed setting options different from the further settings options, wherein judging whether each of the further setting options is selectable includes:

determining that a further setting option is selectable in response to determining that one or more of the plurality of predetermined devices supports a combination of the selected one of the displayed setting options and the further setting option; and determining that the further setting option is not selectable in response to determining that none of the plurality of predetermined devices support a combination of the selected one of the displayed setting options and the further setting option, displaying selectable further setting options, judged to be selectable by the judging step, in a first displaying state; and displaying non-selectable further setting options, judged to be not selectable in the judging step, in a second displaying state different from the first displaying state.

14. The computer program product according to claim 13, wherein the method further comprises a step of displaying each device identified in the identifying step in a third displaying state.

15. The computer readable storage medium according to claim 14, wherein the method further comprises a step of displaying remaining devices, of the plurality of predetermined devices, not identified in the identifying step in a fourth displaying state different from the third displaying state.

16. The computer readable storage medium according to claim 15, wherein the fourth displaying state is a state in which each of the remaining devices is displayed with an attention mark.

17. The computer readable storage medium according to claim 14, wherein the third displaying state is a highlighted state.

18. The computer readable storage medium according to claim 13, wherein each of the plurality of predetermined devices includes an image forming device.

19. The computer readable storage medium according to claim 18, wherein the setting item includes one of a media type, a paper size, color and printing quality.

20. The computer readable storage medium according to claim 13, wherein each of the plurality of predetermined devices includes an image reading device.

21. The computer readable storage medium according to claim 20, wherein the setting item includes one of resolution, a number of colors, and a type of feeding.

22. The computer readable storage medium according to claim 13, wherein the judging in the judging step is conducted further based on states of the plurality of predetermined devices.

23. The computer readable storage medium according to claim 13, wherein the second displaying state is a state in which each of the non-selectable further setting options judged to be not selectable is displayed with an attention mark.

24. The computer readable storage medium according to claim 13, the method further comprising a step of receiving a user's further selection of one of the selectable further setting options of the further setting item, wherein at least one device supports both the selected one of the setting options and the selected one of the further setting options.

25. A terminal device for setting up an operating state for a plurality of predetermined devices connected to the terminal device comprising:
 a display system;
 a processor; and
 a memory operatively coupled to the processor and storing instructions that when executed, cause the terminal device to:
  collect, from all of the plurality of predetermined devices, all setting options and further setting options, each of the collected setting options being supported by at least one of the plurality of predetermined devices as an option of a setting item and each of the collected further setting options being supported by at least one of the plurality of predetermined devices as an option of a further setting item;
  cause the display system to display, without selecting one of the plurality of predetermined devices, an interface element configured to receive a selection of a setting option for the setting item, wherein only the collected setting options are displayed in the interface element in a user-selectable state;
  cause the display system to further display all of the collected further setting options of the further setting item without selecting one of the plurality of predetermined devices, together with displaying all of the collected setting options of the setting item;
  receive a user selection of one of the displayed setting options one of the setting item through the interface element;
  identify at least one device supporting the selected one of the setting options of the setting item, from among the plurality of predetermined devices, responsive to the user selection;
  judge, prior to selection of one or more of the further setting options, whether each of the further setting options is selectable in response to the user selection of the one of the displayed setting options different from the further settings options, wherein judging whether each of the further setting options is selectable includes:
   determining that a further setting option is selectable in response to determining that one or more of the plurality of predetermined devices supports a combination of the selected one of the displayed setting options and the further setting option; and
   determining that the further setting option is not selectable in response to determining that none of the plurality of predetermined devices support a combination of the selected one of the displayed setting options and the further setting option,
  display selectable further setting options, judged to be selectable by the judging step, in a first displaying state; and
  display non-selectable further setting options, judged to be not selectable in the judging step, in a second displaying state different from the first displaying state.

26. The terminal device according to claim 25, wherein the plurality of predetermined devices respectively include image forming devices.

27. The terminal device according to claim 25, wherein the plurality of predetermined devices respectively include image reading devices.

* * * * *